US012812452B2

(12) United States Patent
Kassir et al.

(10) Patent No.: US 12,812,452 B2
(45) Date of Patent: Nov. 24, 2026

(54) SWITCHING A DYNAMIC DISTRIBUTED COMPUTE LOCATION USING A QUALITY OF SERVICE METRIC

(71) Applicant: QUALCOMM Incorporated, San Diego, CA (US)

(72) Inventors: Saadallah Kassir, San Diego, CA (US); Ravi Agarwal, San Diego, CA (US); Peerapol Tinnakornsrisuphap, San Diego, CA (US); Sanket Sanjay Kalamkar, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 18/640,740

(22) Filed: Apr. 19, 2024

(65) Prior Publication Data

US 2025/0267503 A1 Aug. 21, 2025

Related U.S. Application Data

(60) Provisional application No. 63/554,556, filed on Feb. 16, 2024.

(51) Int. Cl.

*H04W 28/02* (2009.01)
*H04L 43/0864* (2022.01)

(52) U.S. Cl.

CPC ..... *H04W 28/0268* (2013.01); *H04L 43/0864* (2013.01); *H04W 28/0215* (2013.01); *H04W 28/0289* (2013.01)

(58) Field of Classification Search

CPC ......... H04W 28/0268; H04W 28/0215; H04W 28/0289; H04L 43/0864

See application file for complete search history.

(56) References Cited

U.S. PATENT DOCUMENTS

2021/0058473 A1 2/2021 Yerli
2023/0074288 A1 3/2023 Filippou et al.
(Continued)

FOREIGN PATENT DOCUMENTS

CN 114173374 A * 3/2022 ............ H04W 28/24

OTHER PUBLICATIONS

International Search Report and Written Opinion—PCT/US2025/012099—ISA/EPO—May 9, 2025.

*Primary Examiner* — Erika A Washington
(74) *Attorney, Agent, or Firm* — QUALCOMM Incorporated

(57) ABSTRACT

Various aspects of the present disclosure generally relate to wireless communication. In some aspects, a computing device may obtain a quality of service (QoS) metric that is based at least in part on a user equipment (UE) linked to an extended reality (XR) device. The computing device may derive, using at least the QoS metric, a potential dynamic distributed compute (DDC) location for application data associated with the XR device, the potential DDC location comprising at least one of: the UE, an application server associated with the application data, or a DDC orchestrator at a network node. The computing device may indicate, selectively, the potential DDC location to at least one of: the UE, the application server, or the network node. Numerous other aspects are described.

18 Claims, 14 Drawing Sheets

(56) References Cited

U.S. PATENT DOCUMENTS

| | | | | |
|---|---|---|---|---|
| 2023/0120629 | A1 * | 4/2023 | Cui | H04L 41/5067 709/226 |
| 2023/0308496 | A1 | 9/2023 | Lee et al. | |
| 2025/0159673 | A1 * | 5/2025 | Esswie | H04W 28/0268 |

* cited by examiner

500

502

| KPIs | Remote Compute Location | Local Compute Location |
|---|---|---|
| Device Power Consumption for Radio Operation | Higher | Lower |
| Device Power Consumption for Computation Operations | Lower | Higher |
| Rendering Quality | Higher | Lower |
| Radio Operation Latency | Higher | Lower |
| Compute Operation Latency | Lower | Higher |

FIG. 5

SWITCHING A DYNAMIC DISTRIBUTED COMPUTE LOCATION USING A QUALITY OF SERVICE METRIC

CROSS-REFERENCE TO RELATED APPLICATION

This Patent Application claims priority to U.S. Patent Application No. 63/554,556, filed on Feb. 16, 2024, entitled "SWITCHING A DYNAMIC DISTRIBUTED COMPUTE LOCATION USING A QUALITY OF SERVICE METRIC," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically relate to techniques, apparatuses, and methods for switching a dynamic distributed compute location using a quality of service metric.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method performed by a computing device. The method may include obtaining a quality of service (QoS) metric that is based at least in part on a user equipment (UE) linked to an extended reality (XR) device. The method may include deriving, using at least the QoS metric, a potential dynamic distributed compute (DDC) location for application data associated with the XR device, the potential DDC location comprising at least one of, the UE, an application server associated with the application data, or a DDC orchestrator at a network node. The method may include indicating, selectively, the potential DDC location to at least one of, the UE, the application server, or the network node.

Some aspects described herein relate to a method performed by a computing device. The method may include obtaining a channel quality metric that is based at least in part on a communication link between a UE and an XR device. The method may include deriving, using at least the channel quality metric that is based at least in part on the communication link between the UE and the XR device, a potential DDC location for application data associated with the XR device, the potential DDC location comprising at least one of, the UE, an application server associated with the application data, or a DDC orchestrator at a network node. The method may include indicating, selectively, the potential DDC location to at least one of, the UE, the application server, or the network node.

Some aspects described herein relate to an apparatus for wireless communication at a computing device. The apparatus may include one or more memories and one or more processors coupled to the one or more memories. The one or more processors may be configured to obtain a QoS metric that is based at least in part on a UE linked to an XR device. The one or more processors may be configured to derive, using at least the QoS metric, a potential DDC location for application data associated with the XR device, the potential DDC location comprising at least one of, the UE, an application server associated with the application data, or a DDC orchestrator at a network node. The one or more processors may be configured to indicate, selectively, the potential DDC location to at least one of, the UE, the application server, or the network node.

Some aspects described herein relate to an apparatus for wireless communication at a computing device. The apparatus may include one or more memories and one or more processors coupled to the one or more memories. The one or more processors may be configured to obtain a channel quality metric that is based at least in part on a communication link between a UE and an XR device. The one or more processors may be configured to derive, using at least the channel quality metric that is based at least in part on the communication link between the UE and the XR device, a potential DDC location for application data associated with the XR device, the potential DDC location comprising at least one of, the UE, an application server associated with the application data, or a DDC orchestrator at a network node. The one or more processors may be configured to indicate, selectively, the potential DDC location to at least one of, the UE, the application server, or the network node.

Some aspects described herein relate to a non-transitory computer-readable medium that stores a set of instructions for wireless communication by a computing device. The set of instructions, when executed by one or more processors of the computing device, may cause the computing device to obtain a QoS metric that is based at least in part on a UE linked to an XR device. The set of instructions, when executed by one or more processors of the computing device, may cause the computing device to derive, using at least the QoS metric, a potential DDC location for application data associated with the XR device, the potential DDC location comprising at least one of, the UE, an application server associated with the application data, or a DDC orchestrator at a network node. The set of instructions, when executed by one or more processors of the computing device, may cause the computing device to indicate, selectively, the potential DDC location to at least one of, the UE, the application server, or the network node.

Some aspects described herein relate to a non-transitory computer-readable medium that stores a set of instructions for wireless communication by a computing device. The set of instructions, when executed by one or more processors of the computing device, may cause the computing device to obtain a channel quality metric that is based at least in part on a communication link between a UE and an XR device. The set of instructions, when executed by one or more processors of the computing device, may cause the computing device to derive, using at least the channel quality metric that is based at least in part on the communication link between the UE and the XR device, a potential DDC location for application data associated with the XR device, the potential DDC location comprising at least one of, the UE, an application server associated with the application data, or a DDC orchestrator at a network node. The set of instructions, when executed by one or more processors of the computing device, may cause the computing device to indicate, selectively, the potential DDC location to at least one of, the UE, the application server, or the network node.

Some aspects described herein relate to an apparatus for wireless communication. The apparatus may include means for obtaining a QoS metric that is based at least in part on a UE linked to an XR device. The apparatus may include means for deriving, using at least the QoS metric, a potential DDC location for application data associated with the XR device, the potential DDC location comprising at least one of, the UE, an application server associated with the application data, or a DDC orchestrator at a network node. The apparatus may include means for indicating, selectively, the potential DDC location to at least one of, the UE, the application server, or the network node.

Some aspects described herein relate to an apparatus for wireless communication. The apparatus may include means for obtaining a channel quality metric that is based at least in part on a communication link between a UE and an XR device. The apparatus may include means for deriving, using at least the channel quality metric that is based at least in part on the communication link between the UE and the XR device, a potential DDC location for application data associated with the XR device, the potential DDC location comprising at least one of, the UE, an application server associated with the application data, or a DDC orchestrator at a network node. The apparatus may include means for indicating, selectively, the potential DDC location to at least one of, the UE, the application server, or the network node.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 5 is a diagram illustrating an example of tradeoffs between local computing and remote computing, in accordance with the present disclosure.

DETAILED DESCRIPTION

Figure 1:
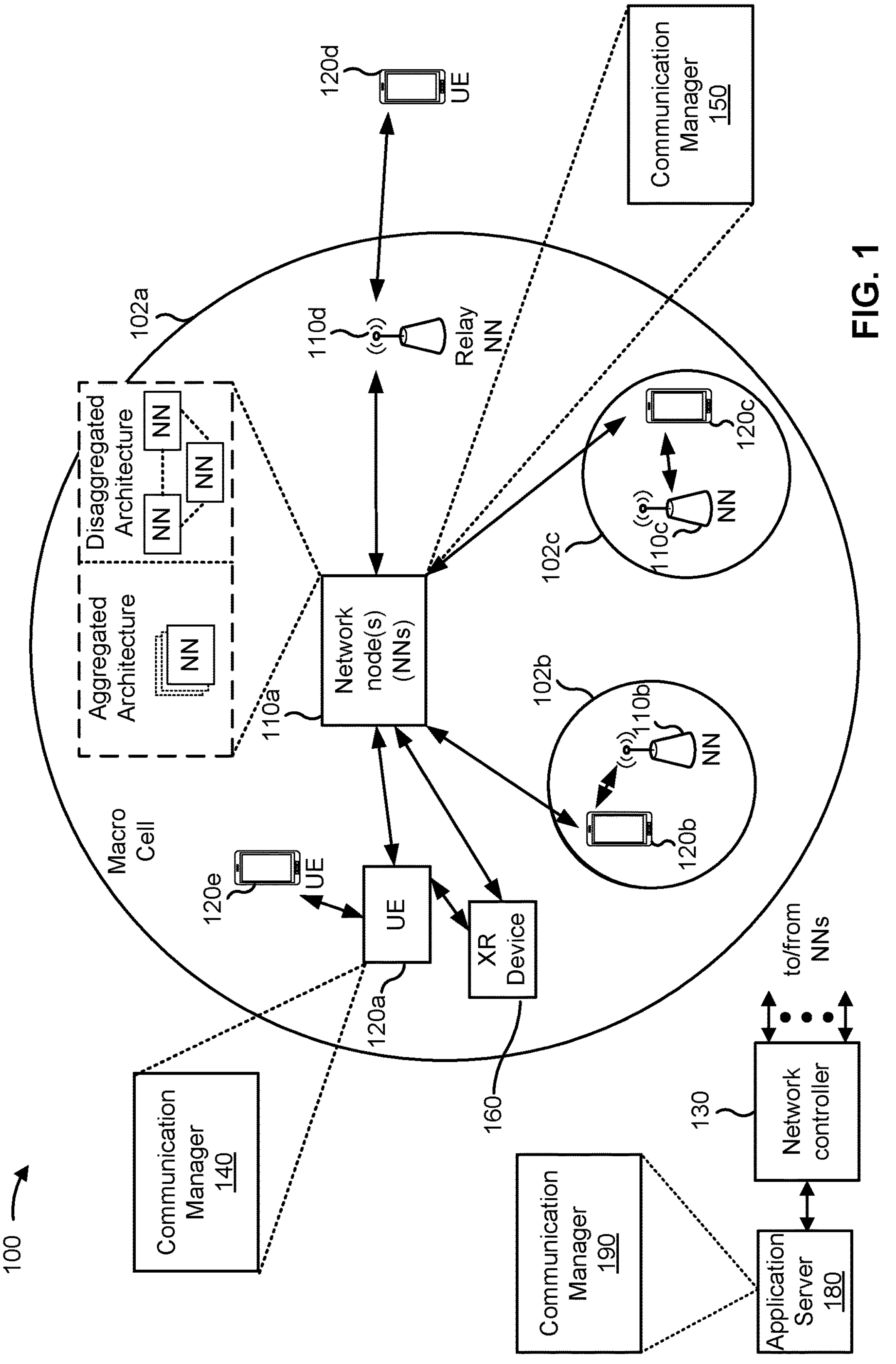
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Distributed computing may partition computations of an application such that a first processor may execute and/or compute a first portion of the computations and a second processor may execute and/or compute a second portion of the computations. In some aspects, an extended reality (XR) device may have fewer computational resources relative to a user equipment (UE) and/or an application server, such as a shorter battery life and/or reduced processing capabilities. To preserve the computational resources of the XR device, some systems may split at least some computations and/or processing of an XR application from being performed by the XR device to being performed by a UE tethered and/or connected to the XR device, which may also be referred to as local computing. Some of the computations and/or processing may be located at a remote application server, which may also be referred to as remote computing. "Dynamic distributed computing (DDC)" may denote the dynamic switching of a DDC location (e.g., a computing device that performs offloaded computations). Offloading XR computations to an application server and/or UE may conserve processing and/or battery resources of the XR device and, in some scenarios, potentially conserving processing and/or battery resources of a UE connected to the XR device. Alternatively, or additionally, offloading XR computations may improve rendering quality (e.g., increase an image resolution).

Offloading resource-intensive computations to an application server may result in tradeoffs within an XR system, such as increased data transfer latency, increased power consumption, and/or decreased data throughput. For instance, a propagation delay between the application server and an application client executed by the XR device and/or the UE may introduce a data transfer latency delay that may, or may not, result in rendering errors.

Figure 4:
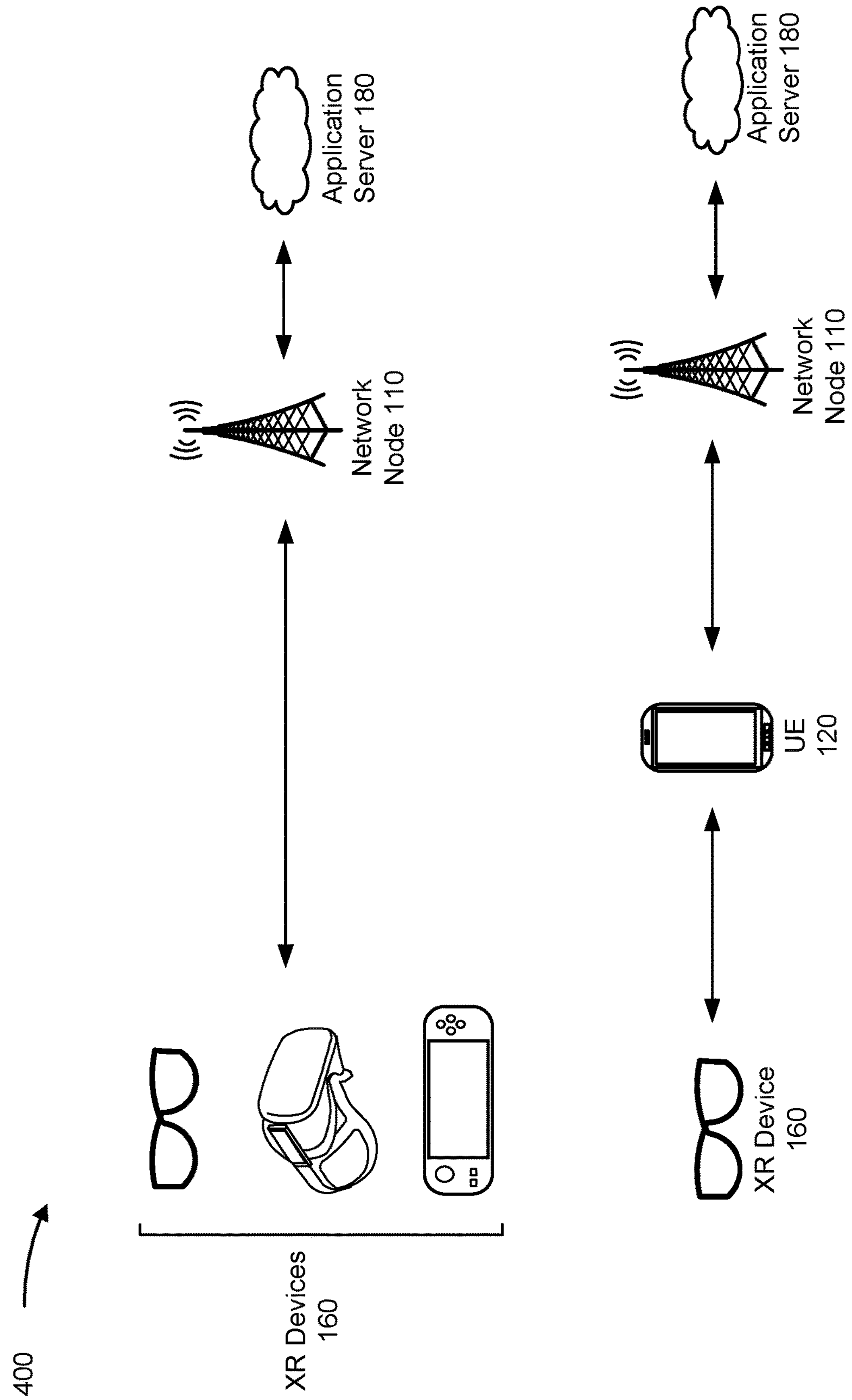
FIG. 4 is a diagram illustrating an example of devices designed for XR traffic applications, in accordance with the present disclosure.

Over time, a state of an XR system, such as any combination of devices and/or wireless communications used for XR traffic applications as described with regard to FIG. 4, may vary. To illustrate, at a start of an XR session, a UE tethered to an XR device may have a battery with full power resources and, over time, the UE may drain the power resources, such as in a scenario in which the UE performs local DDC processing. As another example, at the start of an XR session, network congestion may be at a first level that enables an application server performing remote DDC processing to deliver XR output data (e.g., imaging data) with minimal data transfer latency and/or with a data transfer latency that satisfies a timing condition at an XR device. Over time, the network congestion may be at a second level that result in the application server failing to deliver the XR output data (e.g., imaging data) with minimal data transfer latency and/or failing to satisfy the timing condition at the XR device. Without consideration of the various tradeoffs a computing device in an XR system (e.g., an application server and/or a UE) that selects a DDC location may configure the XR system to use a sub-optimal DDC location that needlessly consumes power resources at a device (e.g., a UE), increases a data transfer latency observed by an XR device, and/or reduces a rendering quality.

Various aspects relate generally to switching a DDC location using a quality of service (QoS) metric. Some aspects more specifically relate to dynamically determining whether to switch DDC locations based at least in part on a QoS metric that indicates a state of an XR system. In some aspects, a computing device (e.g., an application server, a network node, and/or a UE) may obtain a QoS metric that is based at least in part on a UE linked to an XR device. The computing device may derive, using at least the QoS metric, a potential DDC location for application data associated with the XR device. In some aspects, the potential DDC location may include the UE, the application server associated with the application data, and/or a DDC orchestrator at the network node. Based at least in part on deriving the potential DDC location using the QoS metric, the computing device may indicate, selectively, and the potential DDC location to any combination of the UE, the application server, and/or the network node.

Particular aspects of the subject matter described in this disclosure can be implemented to realize one or more of the following potential advantages. In some examples, by deriving the potential DDC location using the QoS metric, the described techniques can be used to provide a computing device with visibility into a state of an XR system, such as a current network congestion level, current device capabilities, and/or resource availability. More visibility into the state of an XR system may enable the computing device to select a DDC location that is more optimal for satisfying a prioritization of tradeoffs in an XR system. To illustrate, without using a QoS metric, such as a network congestion level, the computing device may select a first DDC location that results in the XR system failing to satisfy a timing condition at an XR device due to a radio operation latency. Using the QoS metric to select the DDC location may enable the computing device to select a second DDC location that mitigates the radio operation latency and/or enables the XR system to satisfy the timing condition at the XR device.

In this way, the techniques described herein enable the location at which XR computation is to be performed for an XR device to be dynamically changed based at least in part on various conditions that may impact the rendering quality, the latency, the power consumption of the XR device and/or the UE, and/or the data rate of the transfer of the XR data. Accordingly, the techniques described herein may provide increased rendering quality for an application client of an XR device, may provide improved user experience for the XR device, and/or may increase or prolong the battery life of the XR device and/or the UE.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, XR and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally, or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. “Downlink” (or “DL”) refers to a communication direction from a network node 110 to a UE 120, and “uplink” (or “UL”) refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or “IAB-donor”). The anchor network node 110 may connect to the core network via a wired backhaul link. For example, an Ng interface of the anchor network node 110 may terminate at the core network. Additionally, or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or “IAB-nodes”). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network nodes 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a “multi-hop network.” In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally, or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally, or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100 and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE **120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110**) may perform, or collaborate or negotiate with one or more other UEs to perform, scheduling operations, resource selection operations, and/or other operations for sidelink communications.

In some examples, the wireless network 100 may include an XR device 160. For example, an XR device 160 may communicate with a network node 110 (e.g., via an access link) and/or a UE 120 (e.g., via a sidelink and/or another access link). In some examples, an XR device 160 may be an example of a UE 120. In other words, some UEs 120 may be XR devices 160. XR functionalities may include augmented reality (AR), virtual reality (VR), or mixed reality (MR), among other examples. For example, when providing an XR service, the XR device 160 may provide rendered data via a display, such as a screen, a set of VR goggles, a heads-up display, or another type of display. The XR device 160 may be an augmented reality (AR) glasses device, a virtual reality (VR) glass device, or other gaming device.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a computing device (e.g., a network node 110, a UE 120, and/or an application server 180) may include a communication manager (e.g., communication manager 150, communication 140, and/or communication manager 190, respectively). As described in more detail elsewhere herein, the communication manager (e.g., communication manager 150, communication 140, and/or communication manager 190) may obtain a QoS metric that is based at least in part on a UE linked to an XR device; derive, using at least the QoS metric, a potential DDC location for application data associated with the XR device, the potential DDC location comprising at least one of: the UE, an application server associated with the application data, or a DDC orchestrator at a network node; and indicate, selectively, the potential DDC location to at least one of: the UE, the application server, or the network node.

Alternatively, or additionally, the communication manager (e.g., communication manager 150, communication 140, and/or communication manager 190) may obtain a channel quality metric that is based at least in part on a communication link between a UE and an XR device; derive, using at least the channel quality metric that is based at least in part on the communication link between the UE and the XR device, a potential DDC location for application data associated with the XR device, the potential DDC location comprising at least one of: the UE, an application server associated with the application data, or a DDC orchestrator at a network node; and indicate, selectively, the potential DDC location to at least one of: the UE, the application server, or the network node. Additionally, or alternatively, the communication manager (e.g., communication manager 150, communication 140, and/or communication manager 190) may perform one or more other operations described herein.

As further shown in FIG. 1, an application server 180 may couple to or communicate with one or more network controller 130. The application server 180 may host an application such as a gaming application, a video streaming application, an XR, VR, or AR application, and/or another type of application for which communication flows of streaming data are provided between a UE 120 and the application server 180, between an XR device 160 and the application server 180, and/or between the application server 180 and another device in the wireless network 100. The application server 180 may be included in an edge server, a cloud environment, and/or another type of server environment. A UE 120 and/or an XR device 160 may execute an application client associated with the application hosted by the application server, such as a gaming application client, a video streaming application client, an XR, VR, or AR application client, and/or another type of application client.

As indicated above, FIG. 1 is provided as an example. Other examples may differ from what is described with regard to FIG. 1.

Figure 2:
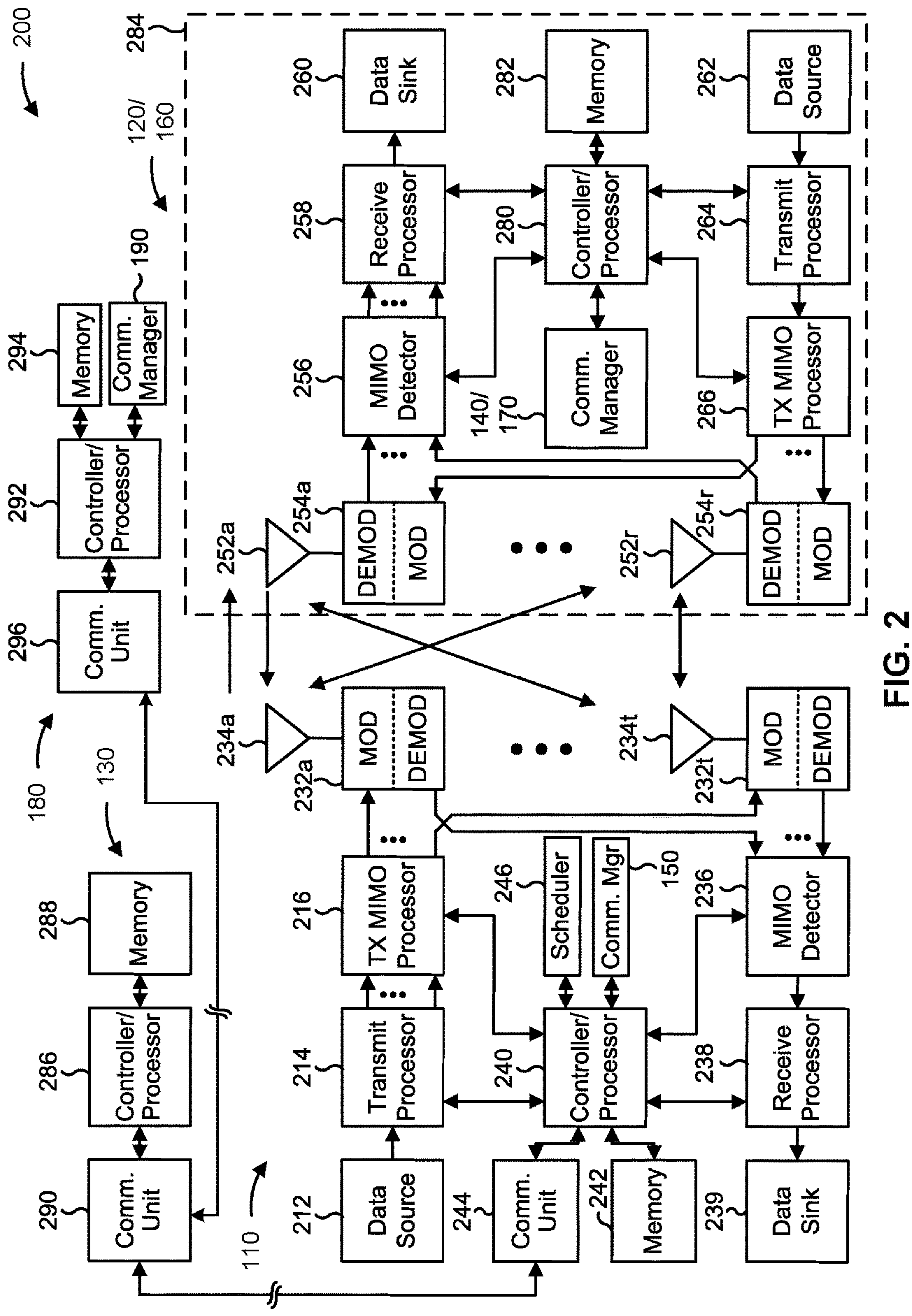
FIG. 2 is a diagram illustrating an example network node in communication with an example user equipment (UE) and/or an extended reality (XR) device in a wireless network, in accordance with the present disclosure.

FIG. 2 is a diagram illustrating an example network node 110 in communication with an example UE 120 and/or an XR device 160 in a wireless network 100, in accordance with the present disclosure. The network node 110 may further communicate with a network controller 130 and an application server 180 via the network controller 130.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some examples, a network node 110 may include an interface, a communication component, or another component that facilitates communication with the UE 120, the XR device 160, or another network node. Some network nodes 110 may not include radio frequency components that facilitate direct communication with the UE 120 or the XR device 160, such as one or more CUs, or one or more DUs.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 and/or the XR device 160 (or a set of UEs 120 or a set of XR devices 160) from the data source 212 (such as a data pipeline or a data queue). In some examples, the transmit processor 214 may select one or more MCSs for the UE 120 and/or the XR device 160 in accordance with one or more channel quality indicators (CQIs) received from the UE 120 and/or the XR device 160. The network node 110 may process the data (for example, including encoding the data) for transmission to the UE 120 and/or the XR device 160 on a downlink in accordance with the MCS(s) selected for the UE 120 and/or the XR device 160 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 and/or the XR device 160 to the network node 110, uplink signals from the UE 120 and/or the XR device 160 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or the XR device and/or UL transmissions from the UE 120 and/or the XR device 160. In some examples, the scheduler 246 may allocate recurring time domain resources and/or frequency domain resources that the UE 120 and/or the XR device 160 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 and/or the XR device 160 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 and/or the XR device 160 may be included in a housing 284.

The network controller 130 may include a communication unit 290, a controller/processor 286, and a memory 288. The network controller 130 may include, for example, one or more devices in a core network. The network controller 130 may communicate with the network node 110 and/or the application server 180 via the communication unit 290.

The application server 180 may include a communication unit 296, a controller/processor 292, and a memory 294. In some aspects, the application server 180 includes the communication manager 190. The application server 180 may communicate with the network controller 130 via the communication unit 296.

In some aspects, one or a combination of the antenna(s) 252, the modem(s) 254, the MIMO detector 256, the receive processor 258, the transmit processor 264, or the TX MIMO processor 266 may be included in a transceiver that is included in the UE 120 and/or the XR device 160. The transceiver may be under control of and used by one or more processors, such as the controller/processor 280, and, in some aspects, in conjunction with processor-readable code stored in the memory 282, to perform aspects of the methods, processes, or operations described herein. In some aspects, the UE 120 and/or the XR device 160 may include another interface, another communication component, and/or another component that facilitates communication with the network node 110 and/or another UE 120 and/or another XR device 160.

For downlink communication from the network node 110 to the UE 120 and/or the XR device 160, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 and/or the XR device 160 to the data sink 260 (which may include a data pipeline, a data queue, and/or an application executed on the UE 120 and/or the XR device 160), and may provide decoded control information and system information to the controller/processor 280.

For uplink communication from the UE 120 and/or the XR device 160 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110, another UE, and/or another XR device 160), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 and/or the XR device 160 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for discrete Fourier transform spread OFDM (DFT-s-OFDM) or cyclic prefix OFDM (CP-OFDM)). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals May be transmitted on a PUSCH, a PUCCH, and/or another type of uplink channel. An uplink signal may carry one or more TBs of data. Sidelink data and control transmissions (that is, transmissions directly between two or more UEs 120, a UE 120 and an XR device 160, and/or two or more XR devices 160) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120, XR devices 160, and/or network nodes 110 may include different numbers of antenna elements. For example, a UE 120 and/or an XR device 160 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
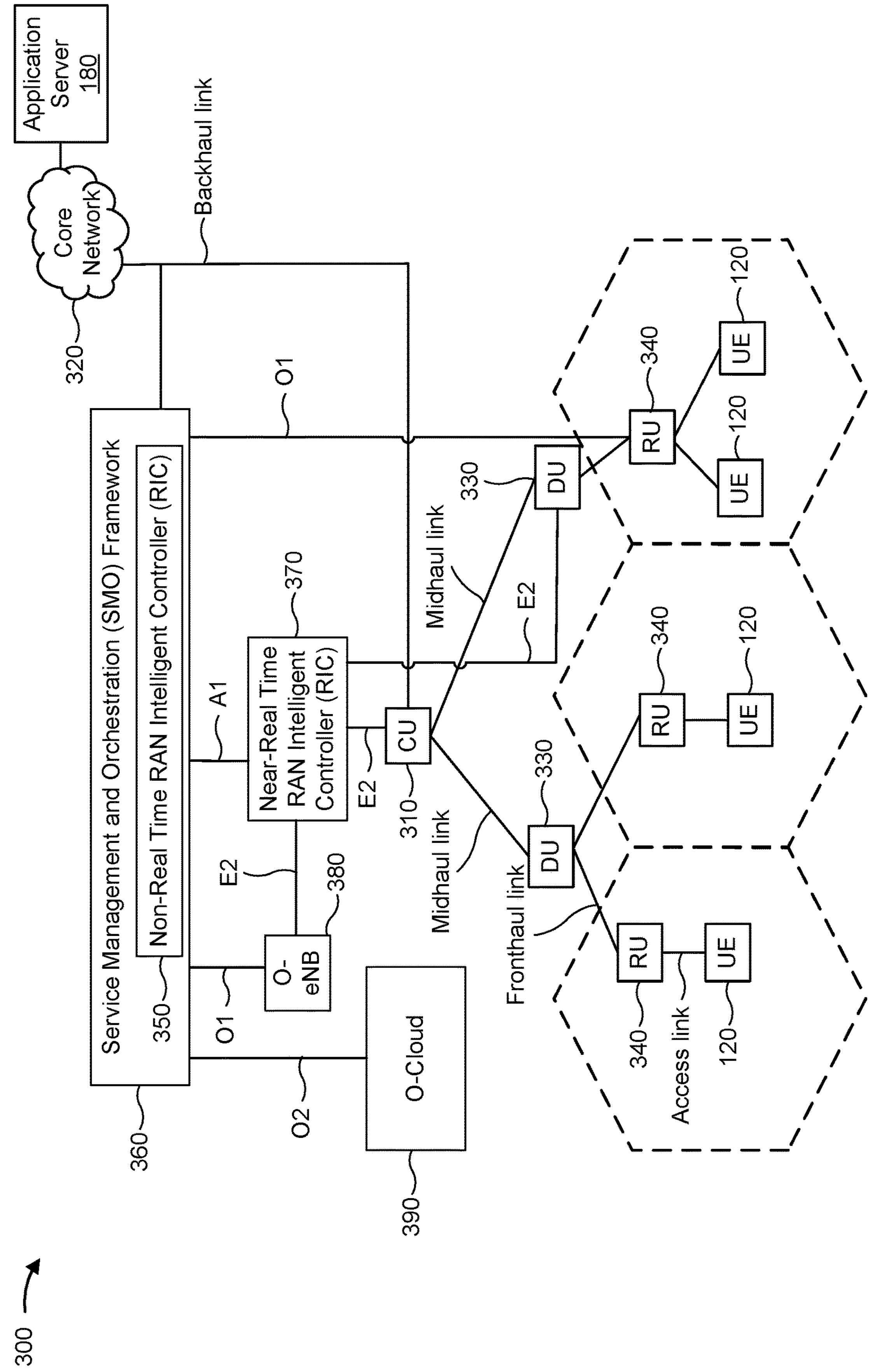
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. Alternatively, or additionally, each of the RUs 340 may communicate with one or more XR devices 160 via respective RF assess links. In some deployments, a UE 120 and/or an XR device 160 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally, or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the controller/processor 292 of the application server 180, the CU 310, the DU 330, the RU 340, or any other component(s) of FIG. 1, 2, or 3 may implement one or more techniques or perform one or more operations associated with switching a DDC location using a quality of service metric, as described in more detail elsewhere herein. For example, the controller/processor 240 of the network node 110, the controller/processor 280 of the UE 120, the controller/processor 292 of the application server 180, any other component(s) of FIG. 2, the CU 310, the DU 330, or the RU 340 may perform or direct operations of, for example, process 1200 of FIG. 12, process 1300 of FIG. 3, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. The memory 294 may store data and program codes for the application server 180. In some examples, the memory 242, the memory 282, or the memory 294 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). The memory 294 may include one or more memories, such as a single memory or multiple different memories (of the same type or of different types). For example, the set of instructions, when executed (for example, directly, or after compiling, converting, or interpreting) by one or more processors of the network node 110, the UE 120, the application server 180, the CU 310, the DU 330, or the RU 340, may cause the one or more processors to perform process 1200 of FIG. 12, process 1300 of FIG. 13, or other processes as described herein. In some examples, executing instructions may include running the instructions, converting the instructions, compiling the instructions, and/or interpreting the instructions, among other examples.

In some aspects, a computing device (e.g., a network node 110, a UE 120, and/or an application server 180) includes means for obtaining a QoS metric that is based at least in part on a UE linked to an XR device; means for deriving, using at least the QoS metric, a potential DDC location for application data associated with the XR device, the potential DDC location comprising at least one of: the UE, an application server associated with the application data, or a DDC orchestrator at a network node; and/or means for indicating, selectively, the potential DDC location to at least one of: the UE, the application server, or the network node.

Alternatively, or additionally, the computing device (e.g., the network node 110, the UE 120, and/or the application server 180) includes means for obtaining a channel quality metric that is based at least in part on a communication link between a UE and an XR device; means for deriving, using at least the channel quality metric that is based at least in part on the communication link between the UE and the XR device, a potential DDC location for application data associated with the XR device, the potential DDC location comprising at least one of: the UE, an application server associated with the application data, or a DDC orchestrator at a network node; and/or means for indicating, selectively, the potential DDC location to at least one of: the UE, the application server, or the network node. In some aspects, the means for the computing device (e.g., a network node 110) to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246. In alternate or additional aspects, the means for the computing device (e.g., the UE 120) to perform operations described herein may include, for example, one or more of communication manager 140, antenna 252, modem 254, MIMO detector 256, receive processor 258, transmit processor 264, TX MIMO processor 266, controller/processor 280, or memory 282. In alternate or additional aspects, the means for the computing device (e.g., the application server) to perform operations described herein may include, for example, one or more of communication manager 190, controller/processor 292, memory 294, or communication unit 296.

As indicated above, FIG. 3 is provided as an example. Other examples may differ from what is described with regard to FIG. 3.

FIG. 4 is a diagram illustrating an example 400 of devices designed for XR traffic applications, in accordance with the present disclosure. As shown in FIG. 4, an XR device 160 may communicate with an application server 180.

In some aspects, the XR device 160 communicates with the application server 180 through a UE 120 that communicates with a network node 110 in a wireless network 100. Here, the UE 120 may be communicatively connected with the XR device 160 by a wired (e.g., universal serial bus (USB), serial ATA (SATA)) and/or a wireless (e.g., Bluetooth, Wi-Fi, 5G) connection.

In some aspects, the XR device 160 communicates with the application server 180 without the use of an intermediate UE 120. Here, the XR device 160 communicates wirelessly with a network node 110 in the wireless network 100 to communicate with the application server 180.

As indicated above, an application server 180 may host an application (e.g., an XR application or an application that has XR support). A UE 120 or an XR device 160 may execute an application client that communicates with the application hosted by the application server 180. Applications for an XR device 160 (or for another type of gaming device such as a UE 120) may include a video game (e.g., where multimedia traffic is transferred to and from the application server 180 at a particular frame rate to support audio and/or video rendering) and/or a VR environment (e.g., where multimedia traffic is transferred to and from the application server 180 at a particular polling rate to support sensor input (e.g., 6 degrees of freedom (6DOF) sensor input and feedback), among other examples. Some applications, including applications for XR, VR, AR, and/or gaming, may require low-latency traffic to and from an edge server or a cloud environment. The traffic to and from the edge server or the cloud environment may be periodic, to support a particular frame rate (e.g., 120 frames per second (FPS), 90 FPS, 60 FPS), a particular refresh rate (e.g., 500 Hertz (Hz), 120 Hz), and/or a particular data transfer rate (e.g., 8 megabits per second (Mbps), 30 Mbps, 45 Mbps) for XR traffic applications).

As indicated above, FIG. 4 is provided as an example. Other examples may differ from what is described with regard to FIG. 4.

FIG. 5 is a diagram illustrating an example 500 of tradeoffs between local computing and remote computing, in accordance with the present disclosure.

Distributed computing may partition computations of an application such that a first processor may execute and/or compute a first portion of the computations and a second processor may execute and/or compute a second portion of the computations. In some aspects, an XR device may have fewer computational resources relative to a UE (e.g., a UE 120), such as a shorter battery life and/or reduced processing capabilities. To preserve the computational resources of the XR device, some systems may split at least some computations and/or processing of an XR application from being performed by the XR device to being performed by a UE tethered and/or connected to the XR device, which may also be referred to as local computing. Alternately, or additionally, some of the computations and/or processing may be located at a remote application server, which may also be referred to as remote computing. Examples of computations and/or processing that may be split from an XR device to a UE and/or an application server may include rendering XR data (e.g., rendering XR video and/or rendering XR audio), head tracking, hand tracking, pose tracking, and/or data fetching. Accordingly, the UE and/or the application server may perform computations for the XR device so that the XR device may conserve processing and/or battery resources. To illustrate, an application server may render, as XR output data, a video frame and/or may provide the XR output data to the XR device, either directly or via the UE. Offloading the rendering of XR output data from the XR device to an application server may conserve processing and/or battery resources of a UE connected to the XR device, in addition to conserving processing and/or battery resources of the XR device, and may improve rendering quality. Moreover, this may enable more resource-intensive computations, such as the rendering, to be performed remotely while less resource-intensive and latency-sensitive computations (e.g., hand and/or head tracking) are performed locally at the UE and/or at the XR device.

In some aspects, offloading resource-intensive computations to an application server may result in increased data transfer latency in transferring the XR output data to the XR device and/or the UE. For instance, a propagation delay between the application server and an application client executed by the XR device and/or the UE may introduce a data transfer latency delay that may, or may not, result in rendering errors.

Table 502 shown in FIG. 5 illustrates various tradeoffs between various key performance indicators (KPIs) relative to a computing location. The table 502 includes the following example KPIs: device power consumption for radio communications, device power consumption for computation operations, rendering quality, radio operation latency, and compute operation latency. The table 502 also provides an evaluation of each KPI for a computing device (e.g., a UE tethered to an XR device) based on two possible locations for split and/or distributed processing: (1) a remote compute location (e.g., an application server) and (2) a local compute location (e.g., at the UE).

As shown in FIG. 5 and the table 502, device power consumption used by a UE tethered to an XR device may be higher in a first scenario that uses a remote compute location and/or may be lower in a second scenario that uses a local compute location. For instance, the UE may use reduced radio communications with a network node and/or application server when operating in the second scenario with a local compute location. Device power consumption by the UE for computation operations, however, may be lower in a remote compute location scenario, and higher in a local compute location scenario. For example, the UE may perform more computations when operating in the local compute location scenario. Another KPI, a rendering quality of XR image data, may be higher when the XR image data is generated at the remote compute location, and lower when the XR image data is generated at the local compute location. To illustrate, a remote computing device (e.g., the application server) may have more processing capabilities relative to a UE to generate a higher resolution image. Although rendering quality may be higher for XR rendering when generated at the remote compute location, a radio operation latency (e.g., a data transfer latency) may be higher in a remote compute location scenario, and lower in a local compute location scenario. For instance, a UE tethered to the XR device may use fewer radio communications for transferring the XR rendering data to an XR device relative to a remote compute location transmitting the XR rendering to the UE and/or the XR device. Conversely, a compute operation latency at the UE that is tethered to the XR device may be lower in the remote compute location scenario, and/or higher in the local compute location, scenario based at least in part on the UE having more available processing capabilities for other tasks when XR rendering data is generated at the remote compute location.

Over time, a state of an XR system, such as any combination of devices and/or wireless communications used for XR traffic applications as described with regard to FIG. 4, may vary. To illustrate, at a start of an XR session, a UE tethered to an XR device may have a battery with full power resources and, over time, the UE may drain the power resources, such as in a scenario in which the UE performs local DDC processing. As another example, at the start of an XR session, network congestion may be at a first level that enables an application server performing remote DDC processing to deliver XR output data (e.g., imaging data) with minimal data transfer latency and/or with a data transfer latency that satisfies a timing condition at an XR device. Over time, the network congestion may be at a second level that result in the application server failing to deliver the XR output data (e.g., imaging data) with minimal data transfer latency and/or failing to satisfy the timing condition at the XR device. Without consideration of the various tradeoffs, such as those described with regard to the table 502, a computing device in an XR system (e.g., an application server and/or a UE) may configure the XR system to use a sub-optimal DDC location that consumes power resources at a UE and/or increases a data transfer latency observed by an XR device.

Some aspects described herein provide switching a DDC location using a QoS metric. In some aspects, a computing device (e.g., an application server 180, a network node 110, and/or a UE 120) may obtain a QoS metric that is based at least in part on a UE linked to an XR device. The computing device may derive, using at least the QoS metric, a potential DDC location for application data associated with the XR device. In some aspects, the potential DDC location may include the UE, the application server associated with the application data, and/or a DDC orchestrator at the network node. Based at least in part on deriving the potential DDC location using the QoS metric, the computing device may indicate, selectively, and the potential DDC location to any combination of the UE, the application server, and/or the network node.

"Deriving a DDC location" may denote determining and/or selecting a device to perform DDC processing, such as image rendering, processing object tracking information, and/or data fetching data (e.g., from a third-party server). As described below, a QoS metric may provide a computing device with visibility into a state of an XR system, such as a current network congestion level, current device capabilities, and/or resource availability. Visibility into the state of an XR system may enable the computing device to select a DDC location that is more optimal for satisfying a prioritization of tradeoffs in an XR system, such as one or more of the tradeoffs described with regard to the table 502. To illustrate, without using a QoS metric, such as a network congestion level, the computing device may select a first DDC location that results in the XR system failing to satisfy a timing condition at an XR device due to a radio operation latency. Using the QoS metric to select the DDC location may enable the computing device to select a second DDC location that mitigates the radio operation latency and/or enables the XR system to satisfy the timing condition at the XR device.

In this way, the techniques described herein enable the location at which XR computation is to be performed for an XR device 160 to be dynamically changed based at least in part on various conditions that may impact the rendering quality, the latency, the power consumption of the XR device 160 and/or the UE 120, and/or the data rate of the transfer of the XR data. Accordingly, the techniques described herein may provide increased rendering quality for an application client of an XR device 160, may provide improved user experience for the XR device 160, and/or may increase or prolong the battery life of the XR device 160 and/or the UE 120, among other examples.

As indicated above, FIG. 5 is provided as an example. Other examples may differ from what is described with regard to FIG. 5.

Figure 6:
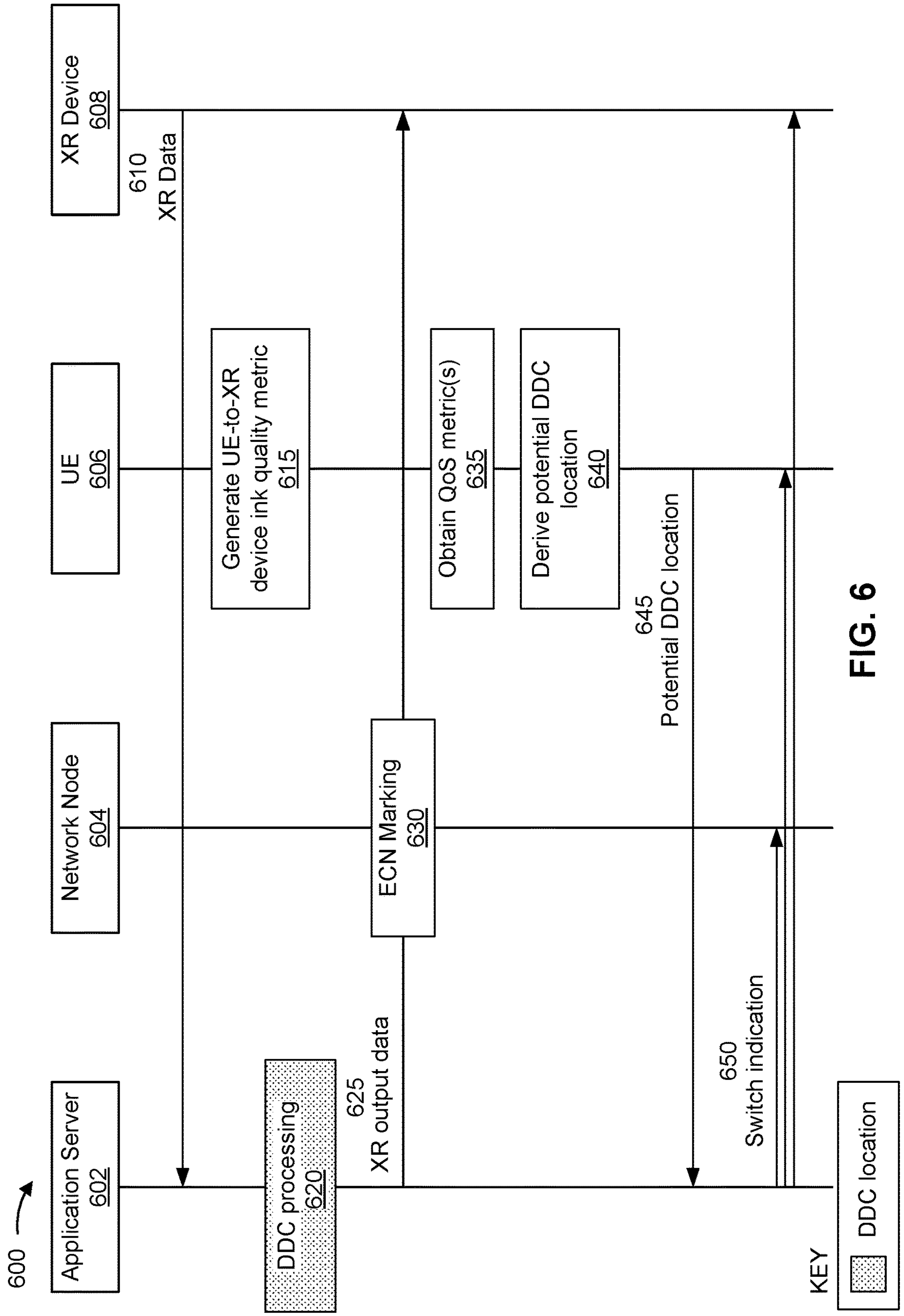
FIG. 6 is a diagram illustrating an example of a wireless communication process between an application server, a network node, a UE, and an XR device, in accordance with the present disclosure.

FIG. 6 is a diagram illustrating an example 600 of a wireless communication process between an application server 602, a network node 604 (e.g., a network node 110), a UE 606 (e.g., a UE 120), and an XR device 608 (e.g., an XR device 160), in accordance with the present disclosure. The example 600 shown by FIG. 6 is an example of a remote DDC location that is at the application server 602, further shown in FIG. 6 through the use of a dotted pattern. In the example 600, the UE 606 may derive a potential DDC location as described below.

As shown by reference number 610, an XR device 608 may transmit, and an application server 602 may receive, XR data (e.g., XR application data). As one example, the XR device may transmit, as the XR data, pose data that indicates position information and/or orientation information of an object and/or avatar, such as position information and/or orientation information about a hand, a head, and/or the XR device. Some other non-limiting examples of XR data may include raw video, compressed video, raw audio, compressed audio, radar data, and/or sensor data. In some aspects, the application server 602 may indirectly receive the XR data from the XR device. To illustrate, the XR device 608 may transmit, and a UE 606 may receive, the XR data using a UE-to-XR device communication link, such as a sidelink, a Bluetooth™ link, and/or a wireless local area network (WLAN) access link (e.g., a Wireless Fidelity (WiFi) link). Alternatively, or additionally, the UE 606 may transmit, and a network node 604 may receive, the XR data using an access link (e.g., a wireless wide area network (WWAN) access link, such as a 5G access link). As shown in FIG. 6, the network node 604 may communicate the XR data to the application server 602, such as through a core network and a backhaul link as described with regard to FIG. 3 and/or through a network controller and one or more communication units as described with regard to FIG. 2. Accordingly, the XR device 608 may transmit, and the application server 602 may receive, the XR data using a combination of one or more wireless communication links, one or more wired communication links, and/or one or more intermediary devices.

As shown by reference number 615, the UE 606 may generate one or more UE-to-XR device link quality metrics and/or a QoS metric. For example, the UE 606 may generate, as a UE-to-XR device link quality metric, a round trip time (RTT) measurement using in-band traffic (e.g., the XR data from the XR device 608). In some aspects, the RTT measurement may provide an indication of signal-to-noise ratio (SNR) variations, load variations (e.g., of a WLAN), and/or network congestion (e.g., of the WLAN) through changes in the RTT. For instance, an increase in an RTT metric relative to a prior RTT metric may indicate that SNR has decreased, and a decrease in the RTT metric relative to a prior RTT metric may indicate low network congestion. Other examples of a UE-to-XR device link quality metrics that may be generated using the in-band data traffic may include a data throughput metric, a packet loss rate metric, a network latency metric, a network utilization metric, and/or a signal strength metric. Alternatively, or additionally, the UE 606 may generate a UE-to-XR device link quality metric using control information that is transmitted via the UE-to-XR device communication link. To illustrate, the UE 606 may generate, as the UE-to-XR device link quality metric, a signal strength metric and/or a channel estimation metric using a reference signal, such as a WLAN reference signal, a Bluetooth™ reference signal, and/or a sidelink reference signal.

As shown by reference number 620, the application server 602 may perform DDC processing (e.g., XR DDC processing) based at least in part on the XR data. As one example, the application server 602 may generate imaging information and/or perform rendering using pose data. Other examples of DDC processing for an XR application may include processing object tracking information (e.g., hand tracking information and/or head tracking information) and/or data fetching (e.g., from a third-party service and/or a website). As one example of processing object tracking information, the XR data may indicate object movement (e.g., a right hand moving by 10 centimeters (cm) to the right relative to a prior position) and the application server 602 may process the XR data to calculate updated coordinates that may be used to generate imaging information (e.g., rendering information that visually moves and/or displays a hand at the updated coordinates).

As shown by reference number 625, the application server 602 may communicate, and the XR device 608 may receive, XR output data (e.g., XR data output by the DDC processing). As one example, the XR output data may include a video frame that is based at least in part on rendering performed by the application server 602. In a similar and/or complementary manner as described with regard to reference number 610, the application server 602 may communicate, and the XR device 608 may receive, the XR output data using any combination of wireless communication link(s), wired communication link(s), and/or intermediary device(s). For instance, the application server 602 may communicate the XR output data to the network node 604 (e.g., using any combination of a core network, a backhaul link, a network controller, and/or communication unit(s)). The network node 604 may transmit, and the UE 606 may receive, the XR output data using a WWAN access link. Alternatively, or additionally, the UE 606 may transmit, and the XR device 608 may receive, the XR output data using a UE-to-XR device communication link, such as a WLAN access link and/or a sidelink.

In some aspects, and as shown by reference number 630, the network node 604 may apply, prior to transmitting the XR output data, an explicit congestion notification (ECN) marking to the XR output data. For example, the network node 604 may determine that a network congestion level (e.g., indicated by a resource utilization metric) satisfies a high congestion threshold. Based at least in part on determining that the network congestion is high, the network node 604 may set an overhead field and/or overhead bit in a transmission that carries the XR output data to a first value (e.g., "1") that indicates network congestion is high. However, in other examples, the network node 604 may set the overhead field and/or the overhead bit to a second value (e.g., "0") to indicate that network congestion is low, such as in a scenario that the network node 604 determines that the network congestion level fails to satisfy the high congestion threshold. Accordingly, "ECN marking" may denote a network node configuring an overhead parameter in a transmission to indicate a network congestion level, and an ECN indication may be a QoS metric. By indicating a network congestion level via ECN marking, the network node 604 may provide information to the UE 606 and/or the application server 602 (e.g., by way of the UE 606) that may be used to determine to perform a switch in a DDC location and/or to change DDC locations.

As shown by reference number 635, the UE 606 may obtain one or more QoS metrics. As one example, the UE 606 may decode the overhead field and/or the overhead bit in the XR output data transmission and obtain the ECN indication as a QoS metric. Alternatively, or additionally, the UE 606 may obtain, as a QoS metric, one or more UE-to-XR device communication link RTT metrics that are generated as described with regard to reference number 615. In some aspects, the UE 606 may analyze the QoS metrics, such as by comparing multiple UE-to-XR device communication link RTT metrics to determine a trend in RTT (e.g., an increasing RTT trend, a stable RTT trend, and/or a decreasing RTT trend). Alternatively, or additionally, the UE 606 may obtain one or more device capabilities, such as a battery power level, a CPU capability, a CPU load, a GPU capability, and/or a GPU load.

As shown by reference number 640, the UE 606 may derive a potential DDC location. To derive the potential DDC location, the UE 606 may analyze one or more QoS metrics, such as an RTT metric and/or an ECN indication. In some aspects, the UE 606 may derive a potential DDC location that is different from a current DDC location. To illustrate, in the example 600, the current DDC location is a remote DDC location at the application server 602 (e.g., remote from the UE 606 and/or the XR device 608). In some aspects, the RTT metric and/or the ECN indication may indicate that network congestion is high, and the UE 606 may consequently determine to switch from a remote DDC location (e.g., the application server) to a local DDC location (e.g., the UE 606 and/or the XR device 608) to reduce a data transfer latency and/or to reduce network congestion.

Alternatively, or additionally, the UE 606 may use other information to derive the potential DDC location, such as a signal quality metric (e.g., an RSRP metric) generated using the UE-to-XR device communication link. As one example, the UE 606 may analyze the signal quality metric of the UE-to-XR device communication link and may determine that the signal quality metric fails to satisfy a high quality threshold (e.g., a high power threshold) and/or satisfies a low quality threshold (e.g., a low power threshold). In some aspects, a low signal quality between the UE 606 and the XR device 608 may result in increased latencies in data transfers between the UE 606 and the XR device 608. Accordingly, the UE 606 may determine to switch from a remote DDC location (e.g., the application server) to a local DDC location (e.g., the UE 606 and/or the XR device 608) to reduce a data transfer latency in the data transfer chain to meet a data transfer latency condition at the XR device 608. That is, the UE 606 may select, as the potential DDC location, the local DDC location to remove an additional data transfer latency from the application server 602 to the UE 606 in the data transfer chain to the XR device 608.

Alternatively, or additionally, the UE 606 may select a potential DDC location based at least in part on a current configuration and/or a device capability of a device include in the XR system, such as a current configuration and/or capability of the UE 606, the application server 602, and/or the XR device 608. For instance, a current configuration of the application server 602 may satisfy a high load threshold, and the UE 606 may determine to switch a DDC location from the application server 602 to the UE 606. As another example, the current configuration of the application server 602 may satisfy a low load threshold, and the UE 606 may determine to not switch DDC locations. That is, the UE 606 may determine that the current DDC location meets operating conditions (e.g., a data transfer latency condition, a rendering quality condition, and/or a power consumption condition at the UE 606), and may determine to retain the current DDC location and/or to not switch to a different DDC location. Other examples of current configurations and/or capabilities may include a central processing unit (CPU) capability and whether the CPU satisfies generating XR output data that has a particular rendering quality (e.g., an image resolution), graphics processing unit (GPU) capability, a level of supported output rendering quality, and/or an output graphics speed.

In some aspects, the UE 606 may select a potential DDC location based at least in part on alternate or additional metrics. As one example, the UE 606 may select the potential DDC location based at least in part on a signal quality metric associated with the network node-to-UE communication link (e.g., a 5G access link signal quality metric). To illustrate, a 5G access link signal quality may indicate a potential data transfer latency in a similar manner as a UE-to-XR device link quality metric. As another example, the UE 606 may select the potential DDC location based at least in part on a power metric of a battery at the UE 606. For instance, the UE 606 may determine to retain the current DDC location at the application server 602 based at least in part on a power metric indicating that the battery at the UE 606 is operating with 25% battery capacity. In other examples, the UE 606 may determine to switch the current DDC location from the application server 602 to the UE 606 based at least in part on the power metric indicating that the battery at the UE 606 is operating with at least 80% battery capacity. In some aspects, the UE 606 may include machine learning capabilities that generate one or more channel condition predictions, such as a predicted data transfer latency, and the UE 606 may determine whether to switch the current DDC location and/or may determine a potential DDC location using the channel condition prediction(s).

The UE 606 may determine a potential DDC location that results in the UE 606 determining to switch from the current DDC location to another device. Alternatively, or additionally, the UE 606 may determine a potential DDC location that results in the UE 606 determining to not switch DDC locations and/or to retain the current DDC location. In determining the potential DDC location, the UE 606 may evaluate and or use any combination of a QoS metric, a UE-to-XR device link quality metric, a UE-to-network node signal quality metric, a device capability, a current operating configuration (e.g., network configuration, UE configuration, server configuration, and/or XR device configuration), a power metric, and/or a channel condition prediction. For instance, the UE 606 may determine to switch a DDC location from the application server 602 to the UE 606 based at least in part on a power metric indicating that the battery of the UE 606 is at 80% battery capacity in combination with a QoS metric that indicates a data transfer latency associated with the application server 602 fails, or may fail, to satisfy a data latency condition at the XR device 608. To illustrate, in some aspects, the UE 606 may include and/or have access to an ordered list of prioritized KPIs (e.g., a KPI prioritization list), such as an ordered list that prioritizes data transfer latency higher than power consumption and/or power consumption higher than a rendering quality. Accordingly, the UE 606 may select and/or derive the DDC location based at least in part on the ordered list. As another example, the UE 606 may calculate a score metric based at least in part on KPI weightings (e.g., a larger weight indicates a higher priority and/or a lower weight indicates a lower priority) and select and/or derive the DDC location based at least in part on the score metric.

As shown by reference number 645, the UE 606 may transmit, and the application server 602 may receive, an indication of the potential DDC location selected by the UE 606, which may alternatively be referred to as a UE-selected DDC location. In some aspects, the UE 606 may selectively transmit the indication of the potential DDC location. As one example, based at least in part on deriving that the potential DDC location is different from a current DDC location, the UE 606 may transmit the indication of the potential DDC location. As another example, based at least in part on deriving that the potential DDC location is a same location as a current DDC location, the UE 606 may refrain from transmitting, and/or may not transmit, the indication of the potential DDC location.

In some aspects, the UE 606 may autonomously switch from using a current DDC location to using the potential DDC location for computing at least some application data (e.g., XR application data). For example, the UE 606 may autonomously switch to using a local DDC location and/or to performing DDC processing based at least in part on transmitting an indication of a potential DDC location. However, in other examples, the UE 606 may not autonomously switch to using the potential DDC location. Instead, the potential DDC location transmitted by the UE 606 may be a UE-recommended DDC location and/or a UE-selected DDC location that may or may not be adopted by the application server 602. Accordingly, a switch to the potential DDC location may be controlled by the application server 602, and the UE 606 may wait to switch DDC locations until receiving confirmation from the application server 602.

The UE 606 may transmit the indication of the potential DDC location to the application server 602 in a similar manner as described with regard to reference number 610. For example, the UE 606 may transmit, and the network node 604 may receive, an indication of the potential DDC location using a WWAN access link, and the network node 604 may communicate the indication of the potential DDC location to the application server 602 using any combination of a core network, a backhaul link, a network controller, and/or communication unit(s).

As shown by reference number 650, the application server 602 may communicate, and any combination of the network node 604, the UE 606, and/or the XR device 608, may receive, a switch instruction to use the potential DDC location for computing at least some application data. That is, the application server 602 may communicate a switch instruction that confirms a switch to the potential DDC location. In some aspects, the application server 602 may selectively communicate the switch indication, such as by communicating the switch indication when a DDC location is changing and not communicating the switch indication when a DDC location is staying the same.

Based at least in part on receiving a switch indication, the UE 606 may switch from using the current DDC location (e.g., at the application server 602) to using the potential DDC location (e.g., at the UE 606). Alternatively, or additionally, the application server 602 may switch to from using the current DDC location to using the potential DDC location based at least in part on communicating the switch instruction. While the application server 602 may indicate to switch to the potential DDC location via the switch instruction, in other examples, the application server 602 may communicate a switch instruction to switch to a different DDC location than the potential DDC location. In some aspects, the switch in DDC locations may be transparent to the XR device 608, while in other aspects, the XR device 608 may switch the addressing of XR data packets to the updated DDC location.

Alternatively, or additionally, the application server 602 not communicate a switch instruction, and the lack of a switch instruction may indicate a denial to switch to the potential DDC location. However, in other aspects, the lack of a switch instruction may implicitly indicate to switch to the potential DDC location. For example, the UE 606 may autonomously switch to the potential DDC without waiting for a switch instruction from the application server 602. As another example, the UE 606 may wait until expiration of a cancel timer to autonomously switch to the potential DDC location. To illustrate, the cancel timer may count down a waiting period for receiving a cancel instruction. Based at least in part on expiration of the cancel timer and not receiving a cancel instruction for canceling a switch to the potential DDC, the UE 606 may autonomously switch to the potential DDC location.

As described above, a UE may use existing data traffic to characterize channel conditions and, consequently, determine a DDC location that aligns with tradeoff priorities (e.g., computation power consumption versus data transfer latency and/or render quality versus radio power consumption). Accordingly, the UE may use the existing data traffic (e.g., in-band data traffic) to obtain new information that may be used to determine the DDC location and/or may simplify signaling between entities by mitigating additional signaling.

As indicated above, FIG. 6 is provided as an example. Other examples may differ from what is described with regard to FIG. 6.

Figure 7:
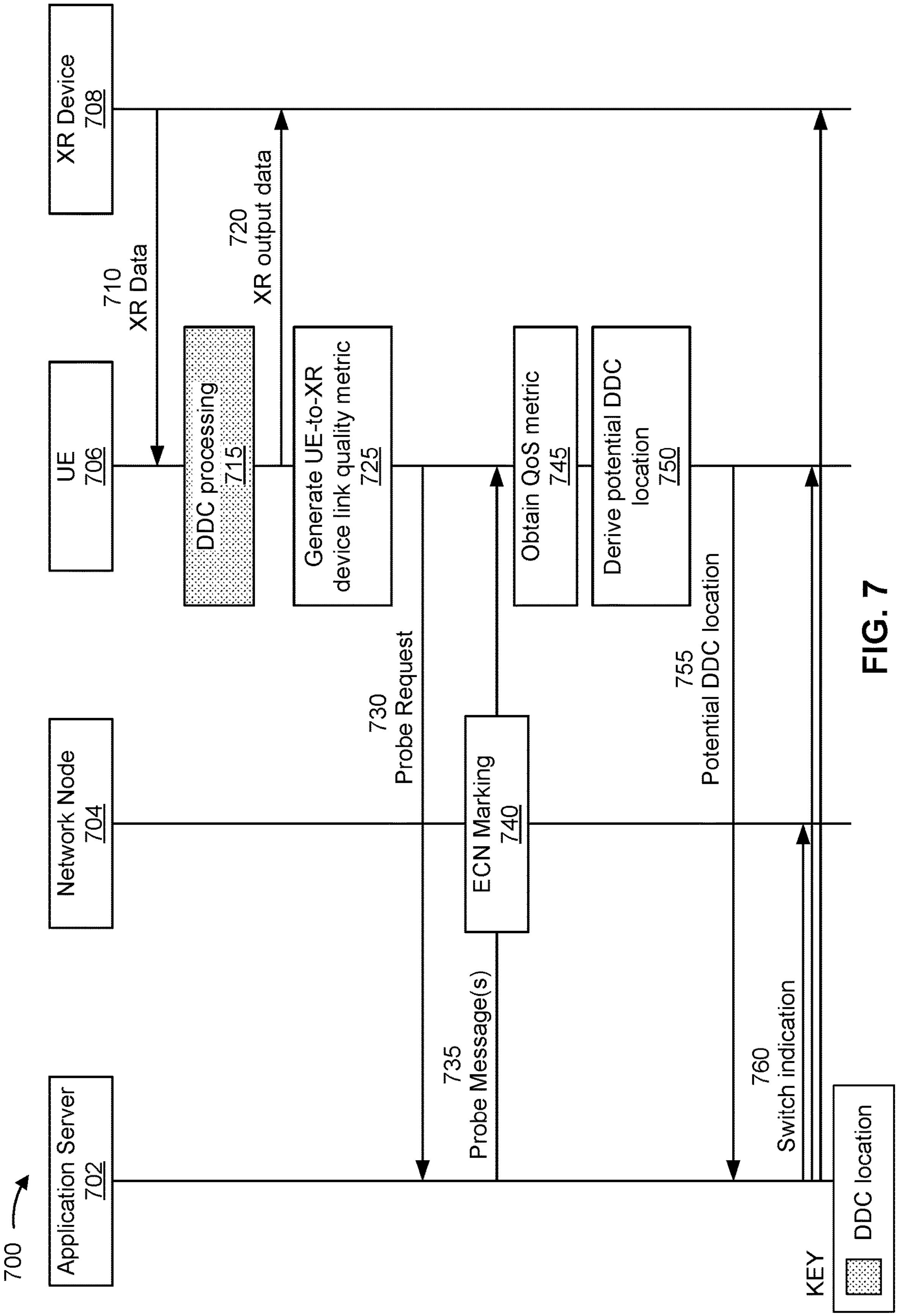
FIG. 7 is a diagram illustrating an example of a wireless communication process between an application server, a network node, a UE, and an XR device, in accordance with the present disclosure.

FIG. 7 is a diagram illustrating an example 700 of a wireless communication process between an application server 702, a network node 704 (e.g., a network node 110), a UE 706 (e.g., a UE 120), and an XR device 708 (e.g., an XR device 160), in accordance with the present disclosure. The example 700 shown by FIG. 7 is an example of a local DDC location that is at the UE 706, further shown by FIG. 7 through the use of a dotted pattern. In the example 700, the UE 706 may derive a potential DDC location as described below.

As shown by reference number 710, an XR device 708 may transmit, and a UE 706 may receive, XR data. As one example, the XR device 708 may transmit pose data to the UE 706 using a UE-to-XR device communication link (e.g., a WLAN access link, a sidelink, and/or a Bluetooth™ link). In some aspects, the XR device 708 may transmit similar XR data as described with regard to reference number 610.

As shown by reference number 715, the UE 706 may perform DDC processing. In some aspects, the UE 706 may perform the DDC processing in a similar manner as the application server 602 described with regard to reference number 620. For instance, the UE 706 may generate imaging and/or rendering information, may process object tracking information, and/or may perform data fetching as at least part of performing the DDC processing.

As shown by reference number 720, the UE 706 may transmit, and the XR device 708 may receive, XR output data. To illustrate, and in a similar manner as described with regard to reference number 625, the UE 706 may transmit, as the XR output data, a video frame. As shown by FIG. 7, the UE 706 may transmit the XR output data to the XR device 708 using the UE-to-XR device communication link.

As shown by reference number 725, the UE 706 may generate one or more UE-to-XR device link quality metrics. Alternatively, or additionally, the UE 706 may generate a QoS metric, such as an RTT metric. As one example, the UE 706 may generate the UE-to-XR device link quality metrics in a similar manner as described with regard to reference number 615. Using in-band traffic data and/or control information (e.g., a reference signal), the UE 706 may generate any combination of an RTT metric associated with the UE-to-XR device communication link, a data throughput metric associated with UE-to-XR device communication link, and/or a signal strength metric associated with the UE-to-XR device communication link.

As shown by reference number 730, the UE 706 may transmit, and an application server 702 may receive, a probe request. In some aspects, the probe request may indicate a request for one or more communication packets (e.g., probe message(s)) that enable the UE 706 to generate information about a network environment (e.g., between the UE 706 and the application server 702), such as a network congestion level, a network latency metric, and/or a network utilization metric. To further explain, based at least in part on the DDC location being at the UE 706, the UE 706 may perform DDC processing as described above, which may reduce downlink communications and/or downlink data traffic from the application server 702 and/or the network node 704. The reduced communications may result in the UE 706 being unable to generate QoS metrics that characterize a communication channel and/or the wireless network between the application server 702 and the UE 706, such as QoS metric(s) as described with regard to reference number 635. Consequently, the UE 706 may be unable to select an optimal potential DDC location (e.g., a DDC location that satisfies a tradeoff metric) without the QoS metrics related to the application server 702 and/or the network node 704. Accordingly, to obtain information that may be used to generate at least some QoS metric(s), the UE 706 transmit a probe request that indicates a request for a probe message. As described below, the UE 706 may use a probe message to calculate at least some QoS metrics. For instance, a probe message may emulate remote DDC location data traffic, and the UE 706 may obtain estimations of QoS metrics for the remote DDC location data traffic to analyze when determining a potential DDC location and/or a switch in a DDC location.

Alternatively, or additionally, the probe request may indicate a request to initiate a probe procedure, and the probe procedure may include the iterative transmission and/or reception of multiple probe messages, such as periodic probe messages and/or a burst of probe messages. In some aspects, the UE 706 may utilize regular and/or periodic probe messages to detect channel quality improvements within an evaluation duration. Accordingly, the probe procedure may be based at least in part the evaluation window used by the UE 706 to obtain and/or generate measurement metrics that provide an accurate capacity estimation (e.g., within an accuracy threshold). As one example, the probe procedure may be configured to operate for a 10 second duration (e.g., an evaluation duration) and/or to transmit periodic probe messages every 200 milliseconds (msec) within the 10 second duration.

In some aspects, a periodicity of probe message transmissions and/or procedure duration used by a probe procedure to iteratively transmit probe messages may be selected to balance air interface resource consumption by the probe procedure with selection of a potential DDC location by the UE 706. That is, the periodicity of probe message transmissions may be selected to enable iterative transmission of probe messages without the probe procedure consuming an unbalanced amount of air interface resources. "Unbalanced amount of air interface resources" may denote a number of air interface resources that are used by a procedure that prevents other devices from access to the air interface resources in time to meet a timing condition. Alternatively, or additionally, the periodicity of the probe message transmissions may be selected to enable the UE 706 to generate and/or obtain updated network information within the evaluation duration and/or within a timing condition. In some aspects, the periodicity of probe messages transmitted by a probe procedure may be based at least in part on a probe message size, to mitigate unbalanced consumption of air interface resources.

In some aspects, the UE 706 may transmit the probe request to obtain a supplemental probe message. For example, the UE 706 and the application server 702 may perform a probe procedure that includes the transmission and/or reception of periodic probe messages. At times, the application server 702 may transmit multiple periodic probe messages based at least in part on receiving a single probe request from the UE 706 that initiates the probe procedure. Based at least in part on initiating the probe procedure, the UE 706 may transmit an additional probe request for an additional probe message that is supplemental and/or additional to the periodic probe messages. For instance, the UE 706 may identify the occurrence of a trigger condition that is associated with requesting a supplemental probe request. Examples of trigger conditions may include a signal quality changing by a first threshold, a battery power level dropping below a second threshold, and/or network congestion increasing by a third threshold. To illustrate, the UE 706 may calculate and/or obtain an updated SNR metric that indicates an increase in channel capacity (e.g., a communication channel between the UE 706 and the network node 704), and the UE 706 may transmit an additional probe request to obtain a supplemental probe message earlier than an next scheduled periodic probe message and/or to trigger a DDC location switch (e.g., to a remote DDC location at the application server 702) prior to the next scheduled periodic probe message.

Alternatively, or additionally, the UE 706 may transmit an early termination request that indicates to stop the probe procedure. As one example, the UE 706 may transmit the early termination request based at least in part on determining to switch the DDC location to the application server 702. As another example, the UE 706 may transmit the early termination request to stop the probe procedure based at least in part on determining that a calculated channel quality (e.g., generated based at least in part on the periodic probe messages) satisfies a quality threshold prior to an end of the probe procedure. Accordingly, the UE 706 may transmit the early termination request to stop the transmission of probe messages and/or to preserve air interface resources for use by other wireless communication devices.

As shown by reference number 735, the application server 702 may communicate, and the UE 706 may receive, one or more probe messages. The probe messages may be one or more aperiodic probe messages, one or more periodic probe message, and/or one or more supplemental probe messages. In some aspects, the application server 702 may autonomously communicate the periodic probe messages based at least in part on receiving an initiation request for a probe procedure and/or using a periodicity (e.g., for transmitting the probe messages) that is configured for the probe procedure.

As shown by reference number 740, the network node 704 may apply ECN marking to a transmission that carries the probe packet(s). As one example, the network node 704 may apply ECN marking to the probe message(s) in a similar manner as described with regard to reference number 630.

As shown by reference number 745, the UE 706 may obtain one or more QoS metrics. As one example, the UE 706 may compute an RTT metric using out-of-band data traffic (e.g., one or more probe message(s)) and/or may receive ECN(s) via the probe message(s) as described above. Alternatively, or additionally, the UE 706 may obtain a QoS metric in a similar manner as described with regard to reference number 635.

As shown by reference number 750, the UE 706 may derive a potential DDC location. For example, the UE 706 may derive the potential DDC location in a similar manner as described with regard to reference number 640. To illustrate, the UE 706 may derive the potential DDC location using any combination of a QoS metric, a UE-to-XR device link quality metric, a UE-to-network node signal quality metric, a device capability, a current configuration, a power metric, and/or a channel condition prediction.

As shown by reference number 755, the UE 706 may transmit, and the application server may receive, an indication of the potential DDC location. For example, the UE 706 may transmit the potential DDC location in a similar manner as described with regard to reference number 645, such as by selectively transmitting the indication of the potential DDC location.

As shown by reference number 760, the application server 702 may communicate, and any combination of the network node 704, the UE 706, and/or the XR device 708 may receive, a switch indication. For instance, the application server 702 may communicate, and the UE 706 may receive the switch instruction in a similar manner as described with regard to reference number 650.

As described above, a UE may use existing data traffic to characterize channel conditions and, consequently, determine a DDC location. That is, the UE may use the existing data traffic (e.g., in-band data traffic) to obtain new information that may be used to determine the DDC location and/or may simplify signaling between entities by mitigating additional signaling. Alternatively, or additionally, the UE may use probe messages to obtain information about channel conditions to an application server to aid in determining a DDC location.

As indicated above, FIG. 7 is provided as an example. Other examples may differ from what is described with regard to FIG. 7.

Figure 8:
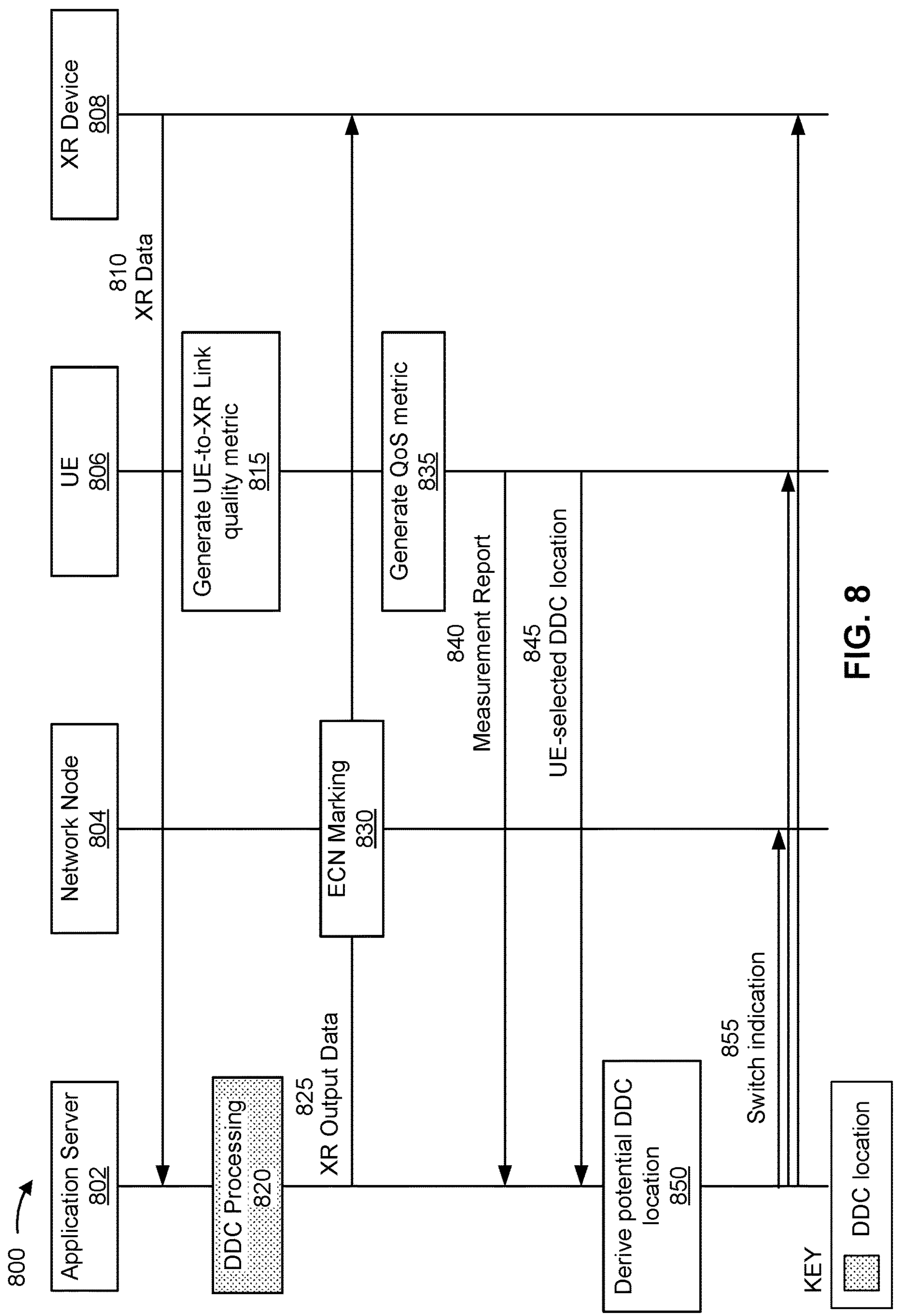
FIG. 8 is a diagram illustrating an example of a wireless communication process between an application server, a network node, a UE, and an XR device, in accordance with the present disclosure.

FIG. 8 is a diagram illustrating an example 800 of a wireless communication process between an application server 802, a network node 804 (e.g., a network node 110), a UE 806 (e.g., a UE 120), and an XR device 808 (e.g., an XR device 160), in accordance with the present disclosure. The example 800 shown by FIG. 8 is an example of a remote DDC location that is at the application server 802, further shown by FIG. 8 through the use of a dotted pattern. In the example 800, the application server 802 may derive a potential DDC location as described below.

As shown by reference number 810, an XR device 808 may transmit, and an application server 802 may receive, XR data (e.g., XR application data). In some aspects, the XR device 808 may transmit the XR data in a similar manner as described with regard to reference number 610.

As shown by reference number 815, the UE 806 may generate one or more UE-to-XR device link quality metrics. In some aspects, the UE 806 may generate the UE-to-XR device link quality metrics in a similar manner as described with regard to reference number 615.

As shown by reference number 820, the application server 802 may perform DDC processing (e.g., XR DDC processing) based at least in part on the XR data. In some aspects, the application server 802 may perform the DDC processing in a similar manner as described with regard to reference number 620.

As shown by reference number 825, the application server 802 may communicate, and the XR device 808 may receive, XR output data (e.g., XR data output by the DDC processing). In some aspects, the application server 802 may communicate, and the XR device 808 may receive, the XR output data in a similar manner as described with regard to reference number 625.

As shown by reference number 830, the network node 804 may apply, prior to transmitting the XR output data, ECN marking to the XR output data. In some aspects, the network node 804 may apply the ECN marking to the XR output data in a similar manner as describe with regard to reference number 630.

As shown by reference number 835, the UE 806 may obtain one or more QoS metrics. In some aspects, the UE 806 may obtain the QoS metric(s) in a similar manner as describe with regard to reference number 635.

As shown by reference number 840, the UE 806 may transmit, and the application server 802 may receive, a measurement report. In some aspects, the measurement report may include one or more QoS metrics generated and/or obtained by the UE as described with regard to reference number 835, including ECN information. Alternatively, or additionally, the measurement report may include one or more UE-to-XR device communication link quality metrics generated by the UE 806 as described with regard to reference number 815. By transmitting the measurement report to the application server 802, the UE 806 may communicate information that may be used by the application server 802 to derive a potential DDC location.

As shown by reference number 845, the UE 806 may transmit, and the application server 802 may receive, a UE-selected DDC location. For instance, the UE 806 may derive the UE-selected DDC location in a similar manner as described with regard to reference number 640 and/or may transmit an indication of the UE selected DDC location as described with regard to reference number 645. While the example 800 includes the UE 806 transmitting an indication of the UE-selected DDC location, the UE 806 may not derive and/or may not transmit an indication of a UE-selected DDC location in other examples.

As shown by reference number 850, the application server 802 may derive a potential DDC location. In some aspects, the application server 802 may derive the potential DDC location in a similar manner as the UE 606 as described with regard to reference number 640. For instance, the application server 802 may analyze one or more QoS metrics, such as an RTT metric and/or an ECN indication, received via the measurement report. As another example, the application server 802 may use alternate or additional information to derive the potential DDC location, such as a UE-to-XR device link quality metric and/or a UE-to-network node link quality metric. As one example, the application server 802 may compare the UE-to-XR device link quality metric to the UE-to-network node link quality metric (e.g., a 5G access link signal quality metric) and/or may determine that the UE-to-XR device link quality metric is higher than the UE-to-network node link quality metric. Accordingly, the application server 802 may determine, as the potential DDC location, a local DDC location (e.g., the UE 806). In some aspects, the application server 802 may select a potential DDC location based at least in part on a current configuration and/or a device capability of a device include in the XR system, such as a current configuration and/or capability of the UE 806, the application server 802, and/or the XR device 808. However, the application server 802 may drive the potential DDC location using other metrics and/or information, such as a power metric and/or a channel condition prediction indicated by the UE 806.

In some aspects, the application server 802 may have access to metrics and/or information that is unavailable to the UE 806. For example, the application server 802 may have access to a server congestion level metric and/or a server computing capability. Accordingly, the application server 802 may use the additional metrics and/or information to derive the potential DDC location, such as by switching to a local DDC location (e.g., the UE 806) based at least in part on the server congestion level metric satisfying a high congestion metric and/or a server computing capability satisfying a reduced capacity metric.

As shown by reference number 855, the application server 802 may communicate, and any combination of the network node 804, the UE 806, and/or the XR device 808 may receive, a switch indication that indicates to initiate a DDC location switch. In some aspects, the application server 802 may communicate the switch indication as described with regard to reference number 650. Alternatively, or additionally, the UE 806 and/or the XR device 808 may switch in a similar manner as described with regard to reference number 650.

As described above, an application server may have access to information unavailable to a UE. Accordingly, in some scenarios, the additional information May enable the application server to derive a more optimal DDC location that satisfies one or more tradeoffs relative to a UE-generated DDC location. Alternatively, or additionally, the application server may selectively grant remote DDC processing to a portion of UEs requesting remote DDC processing based at least in part on operating information about the UEs, such as UE-to-XR device link quality metrics, power level metrics, and/or RTT metrics.

As indicated above, FIG. 8 is provided as an example. Other examples may differ from what is described with regard to FIG. 8.

Figure 9:
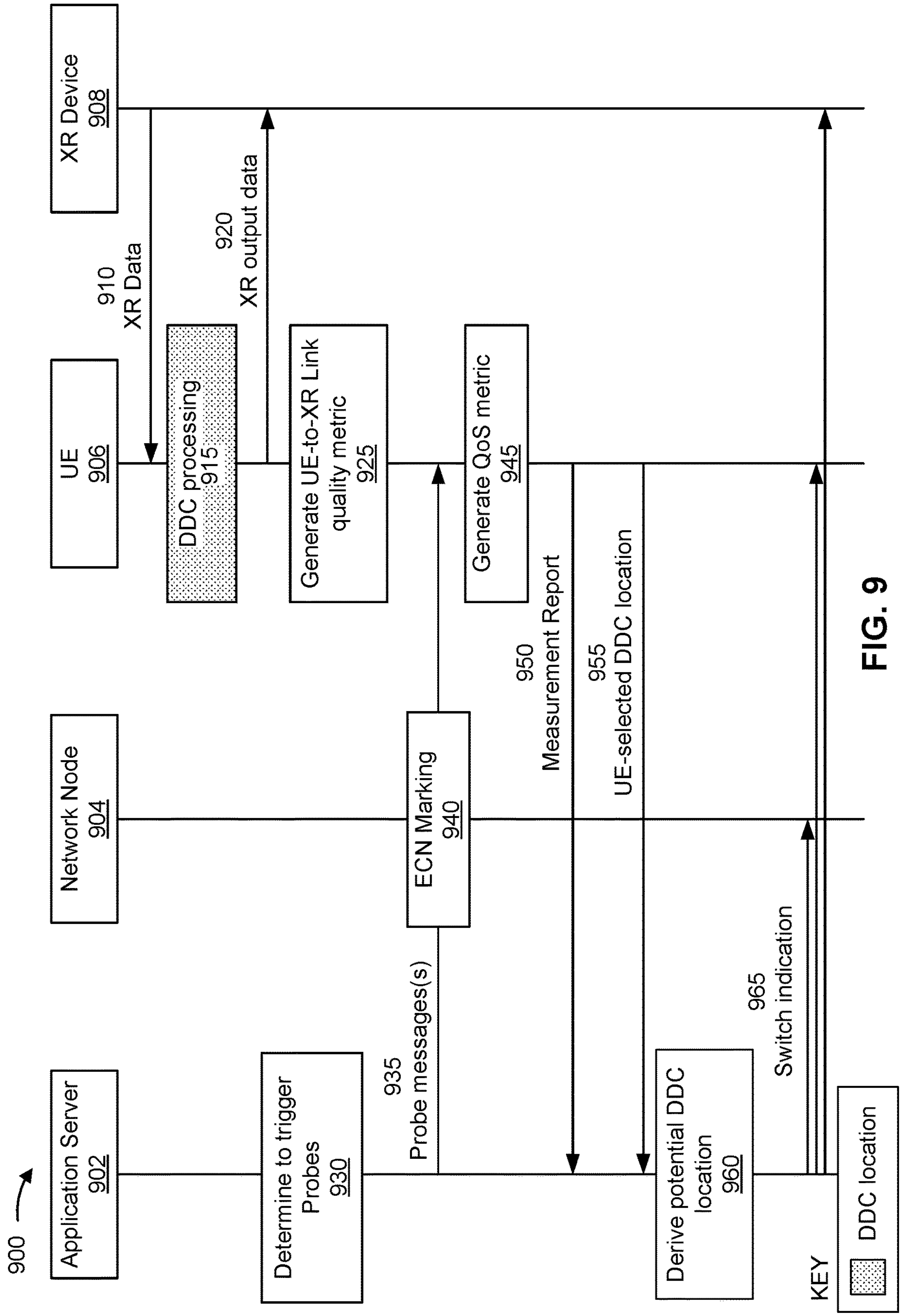
FIG. 9 is a diagram illustrating an example of a wireless communication process between an application server, a network node, a UE, and an XR device, in accordance with the present disclosure.

FIG. 9 is a diagram illustrating an example 900 of a wireless communication process between an application server 902, a network node 904 (e.g., a network node 110), a UE 906 (e.g., a UE 120), and an XR device 908 (e.g., an XR device 160), in accordance with the present disclosure. The example 900 shown in FIG. 9 is an example of a local DDC location that is at the UE 906, further shown in FIG. 9 through the use of a dotted pattern. In the example 900, the application server 902 may derive a potential DDC location as described below.

As shown by reference number 910, an XR device 908 may transmit, and a UE 906 may receive, XR data. In some aspects, the XR device 908, and the UE 906 may receive, the XR data in a similar manner as described with regard to reference number 710.

As shown by reference number 915, the UE 706 may perform DDC processing. In some aspects, the UE 706 may perform DDC processing as described with regard to reference number 715.

As shown by reference number 920, the UE 906 may transmit, and the XR device 908 may receive, XR output data. In some aspects, the UE 906 may transmit, and the XR device 908 may receive, the XR output data in a similar manner as described with regard to reference number 720.

As shown by reference number 925, the UE 906 may generate one or more UE-to-XR link quality metrics. Alternatively, or additionally, the UE 906 may generate one or more QoS metrics. In some aspects, the UE 906 may generate a UE-to-XR link quality metric and/or a QoS metric in a similar manner as described with regard to reference number 725.

As shown by reference number 930, an application server 902 may determine to trigger the transmission of one or more probe messages. Alternatively, or additionally, the application server 902 may determine to initiate a probe procedure, such as a probe procedure as described with regard to FIG. 7. In some aspects, the application server 902 may determine to trigger the transmission of one or more probe messages and/or initiate a probe procedure based at least in part on detecting a trigger condition for switching a DDC location. For instance, the application server 902 may detect, as a trigger condition, a number of devices requesting remote DDC processing and/or a number of devices currently using remote DDC processing satisfies a low request threshold and/or that a server congestion level metric satisfies a low congestion threshold.

As shown by reference number 935, the application server 902 may communicate, and the UE 906 may receive, one or more probe messages. In some aspects, the application server may communicate the probe message(s) in a similar manner as described with regard to reference number 735. Alternatively, or additionally, as shown by reference number 940, the network node 904 may apply ECN marking to the probe message(s). In some aspects, the network node 904 may apply the ECN marking in a similar manner as described with regard to reference number 740.

As shown by reference number 945, the UE 906 may obtain one or more QoS metrics. In some aspects, the UE 906 may obtain the QoS metrics in a similar manner as described with regard to reference number 745.

As shown by reference number 950, the UE 906 may transmit, and the application server 902 may receive, a measurement report (e.g., a UE-generated measurement report). In some aspects, the UE 906 may transmit the measurement report in a similar manner as described with regard to reference number 840. For example, the measurement report may include any combination of a first RTT metric that is based at least in part on out-of-band data traffic (e.g., a probe message), a second RTT metric that is based at least in part on in-band data traffic (e.g., XR data and/or XR output data), and/or an ECN.

As shown by reference number 955, the UE 906 may transmit, and the application server 902 may receive, a UE-selected DDC location. In some aspects, the UE 906 may transmit an indication of the UE-selected DDC location in a similar manner as described with regard to reference number 845. While the example 900 includes the UE 906 transmitting an indication of the UE-selected DDC location, the UE 906 may not derive and/or may not transmit an indication of a UE-selected DDC location in other examples.

As shown by reference number 960, the application server 902 may derive a potential DDC location. In some aspects, the application server 902 may derive the potential DDC location in a similar manner as described with regard to reference number 850.

As shown by reference number 965, the application server 902 may communicate, and any combination of the network node 904, the UE 906, and/or the XR device 908 may receive, a switch indication that indicates to initiate a DDC location switch. In some aspects, the application server 902 may communicate the switch indication as described with regard to reference number 650. Alternatively, or additionally, the UE 806 and/or the XR device 808 may switch in a similar manner as described with regard to reference number 650.

As described above, an application server may have access to information unavailable to a UE. Accordingly, in some scenarios, the additional information may enable the application server to derive a more optimal DDC location that satisfies one or more tradeoffs relative to a UE-generated DDC location. Alternatively, or additionally, the application server may selectively grant remote DDC processing to a portion of UEs requesting remote DDC processing based at least in part on operating information about the UEs, such as UE-to-XR device link quality metrics, power level metrics, and/or RTT metrics.

As indicated above, FIG. 9 is provided as an example. Other examples may differ from what is described with regard to FIG. 9.

Figure 10:
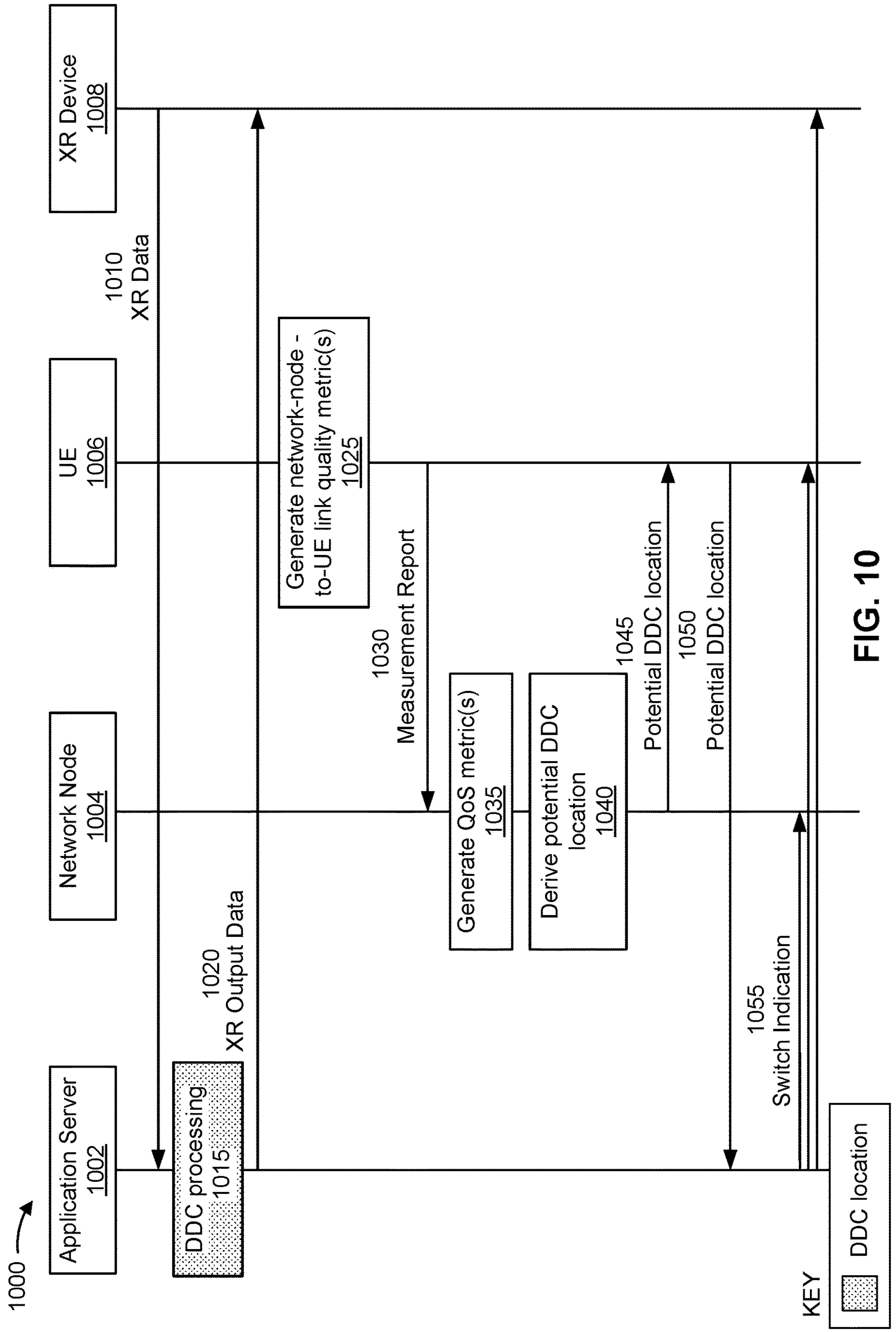
FIG. 10 is a diagram illustrating an example of a wireless communication process between an application server, a network node, a UE, and an XR device, in accordance with the present disclosure.

FIG. 10 is a diagram illustrating an example 1000 of a wireless communication process between an application server 1002, a network node 1004 (e.g., a network node 110), a UE 1006 (e.g., a UE 120), and an XR device 1008 (e.g., an XR device 160), in accordance with the present disclosure. The example 1000 shown in FIG. 10 is an example of a remote DDC location that is at the application server 1002, further shown in FIG. 10 through the use of a dotted pattern. In the example 1000, the network node 1004 may derive a potential DDC location, such as through the use of a DDC orchestrator as described below.

As shown by reference number 1010, an XR device 1008 may transmit, and an application server 1002 may receive, XR data (e.g., XR application data). In some aspects, the XR device 1008 may transmit the XR data in a similar manner as described with regard to reference number 610.

As shown by reference number 1015, the application server 1002 may perform DDC processing (e.g., XR DDC processing) based at least in part on the XR data. In some aspects, the application server 1002 may perform the DDC processing in a similar manner as described with regard to reference number 620.

As shown by reference number 1020, the application server 1002 may communicate, and the XR device 1008 may receive, XR output data (e.g., XR data output by the DDC processing). In some aspects, the application server 1002 may communicate, and the XR device 1008 may receive, the XR output data in a similar manner as described with regard to reference number 625.

As shown by reference number 1025, the UE 1006 may generate one or more UE-to-XR device link quality metrics. In some aspects, the UE 1006 may generate the UE-to-XR device link quality metrics in a similar manner as described with regard to reference number 615.

As shown by reference number 1030, the UE 1006 may transmit, and the network node 1004 may receive, a measurement report. In some aspects, and in a similar manner as described with regard to reference number 840, the measurement report may include one or more QoS metrics generated by the UE, such as an RTT measurement metric generated using in-band data traffic transmitted via the UE-to-XR device communication link. Alternatively, or additionally, the measurement report may include one or more UE-to-XR device communication link quality metrics. In some aspects, the QoS metrics may not include an ECN metric. For instance, based at least in part on the network node 1004 deriving a DDC location as described below, the network node 1004 may use ECN information and/or may not transmit the ECN information to the UE 1006. By transmitting the measurement report to network node 1004, the UE 1006 may communicate information that may be used by network node 1004 to derive a potential DDC location.

While the example 1000 includes the UE 1006 transmitting an indication of the measurement report, the UE 1006 may not derive and/or may not transmit an indication of a measurement report in other examples.

As shown by reference number 1035, the network node 1004 may generate one or more QoS metrics(s). In some aspects, the network node 1004 may have access to information that is unavailable to the UE 1006 and/or the application server 1002. Accordingly, the network node 1004 may generate QoS metric(s) that provide information about a wireless network. To illustrate, the network node 1004 may generate and/or use, as a QoS metric (e.g., a network node generated QoS metric), a network load, a resource utilization metric, an uplink queue size, a downlink queue size, or a data transfer delay estimation metric.

As shown by reference number 1040, the network node 1004 may derive a potential DDC location. In some aspects, the potential DDC location may be referred to as a network node-selected DDC location. For instance, the network node 1104 may include a DDC orchestrator (e.g., a software application) that provides complementary and/or reciprocal functionality to a first XR application at the application server 1002, a second XR application at the UE 1006, and/or a third XR application at the XR device 1008. To illustrate, the complementary functionality may include an ability to collect information about an XR system and/or derive a potential DDC location using the information. That is, the DDC orchestrator may gather information and/or data from any combination of the network node 1004, the UE 1006, and/or the application server 1002 that may be used to determine a potential DDC orchestrator. As one example, the DDC orchestrator may receive a QoS metric (e.g., a network load, a resource utilization metric, an uplink queue size, a downlink queue size, or a data transfer delay estimation metric) and/or signal quality metric (e.g., a 5G access link signal quality metric, such as a signal-to-interference-plus-noise ratio (SINR) and/or RSRP) generated by the network node 1004. Alternatively, or additionally, the DDC orchestrator may receive a measurement report generated by the UE 1006 that indicates a QoS metric (e.g., a UE-generated QoS metric), a signal quality metric (e.g., a UE-to-XR device link quality metric), and/or device capability information (e.g., power consumption metric and/or a battery level metric).

Based at least in part on gathering information, the DDC orchestrator may derive a potential DDC location, such as by deriving the potential DDC location in a similar manner as the UE 606 described with regard to reference number 640 and/or the application server 802 described with regard to reference number 820. In deriving the potential DDC location, the DDC orchestrator may notify the UE 1006 of the potentially DDC location as described below with regard to reference number 1045. In some aspects, notifying the UE 1006 may include selectively notifying the UE 1006, such as by notifying the UE 1006 of the potential DDC location based at least in part on the potential DDC location being different from a current DDC location, and not notifying the UE 1006 of the potential DDC location based at least in part on the potential DDC location being a same DDC location as the current DDC location.

In some aspects, the UE 1006 may be configured to discover a presence of the DDC orchestrator at the network node 1004. For instance, the UE 1006 may use a discovery protocol, such as a domain name system (DNS) discovery protocol to locate and/or connect to the DDC orchestrator. Alternatively, or additionally, the network node 1004 may indicate a presence of the DDC orchestrator to the UE 1006 during an initial access procedure and/or a connection procedure.

As shown by reference number 1045, the network node 1004 may transmit, and the UE 1006 may receive an indication of a potential DDC location. As one example, the DDC orchestrator may initiate transmission of the potential DDC location, and the network node 1004 may transmit an indication of the potential DDC location using a WWAN access link (e.g., a 5G access link) between the network node 1004 and the UE 1006.

As shown by reference number 1050, the UE 1006 may transmit, and the application server 1002 may receive an indication of the potential DDC location (e.g., the network node-selected DDC location). For example, the UE 1006 may transmit, and the network node 1004 may receive, the indication of the potential DDC location using a the WWAN access link, and the network node 1004 may communicate the potential DDC location to the application server 1002, such as through a core network and a backhaul link as described with regard to FIG. 3 and/or through a network controller and one or more communication units as described with regard to FIG. 2.

As shown by reference number 1055, the application server 1002 may communicate, and any combination of the network node 1004, the UE 1006, and/or the XR device 1008 may receive, a switch indication that indicates to initiate a DDC location switch to the potential DDC location. In some aspects, the application server 1002 may communicate the switch indication as described with regard to reference number 650. Alternatively, or additionally, the UE 1006 and/or the XR device 1008 may switch in a similar manner as described with regard to reference number 650. Alternatively, or additionally, the network node 1104 may switch DDC locations.

A network node may have access to one or more QoS metrics that are unavailable to a UE and/or an application server, such as a network load, a resource utilization metric, an uplink queue size, a downlink queue size, and/or a data transfer delay estimation metric as described above. Accordingly, in some scenarios, the additional information available to the network node may enable a DDC orchestrator to select a more optimal DDC location that satisfies one or more tradeoffs relative to a UE-generated DDC location and/or an application server-derived DDC location. Alternatively, or additionally, the network node may selectively grant remote DDC processing to a portion of UEs requesting remote DDC processing based at least in part on operating information about the network congestion and/or available network resources.

As indicated above, FIG. 10 is provided as an example. Other examples may differ from what is described with regard to FIG. 10.

Figure 11:
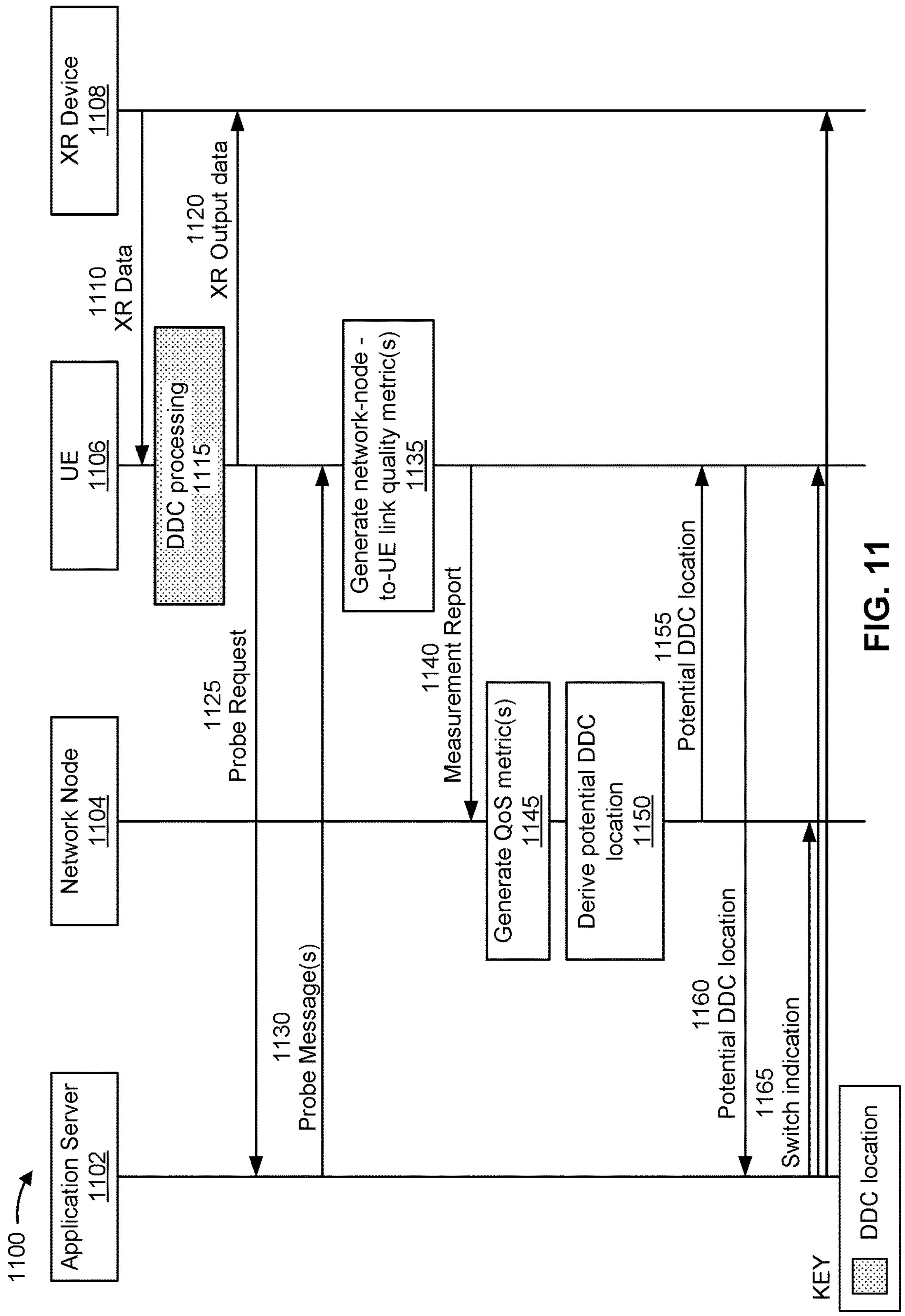
FIG. 11 is a diagram illustrating an example of a wireless communication process between an application server, a network node, a UE, and an XR device, in accordance with the present disclosure.

FIG. 11 is a diagram illustrating an example 1100 of a wireless communication process between an application server 1102, a network node 1104 (e.g., a network node 110), a UE 1106 (e.g., a UE 120), and an XR device 1108 (e.g., an XR device 160), in accordance with the present disclosure. The example 1100 shown in FIG. 11 is an example of a local DDC location that is at the UE 1106, further shown in FIG. 11 through the use of a dotted pattern. In the example 1100, the network node 1104 may derive a potential DDC location as described below.

As shown by reference number 1110, an XR device 1108 may transmit, and a UE 1106 may receive, XR data. In some aspects, the XR device 1108, and the UE 1106 may receive, the XR data in a similar manner as described with regard to reference number 710.

As shown by reference number 1115, the UE 1106 may perform DDC processing. In some aspects, the UE 1106 may perform the DDC processing in a similar manner as described with regard to reference number 715. For instance, the UE 1106 may generate imaging and/or rendering information, may process object tracking information, and/or may perform data fetching as at least part of performing the DDC processing.

As shown by reference number 1120, the UE 1106 may transmit, and the XR device 1108 may receive, XR output data. In some aspects, the UE 1106 may transmit, and the XR device 1108 may receive, the XR output data in a similar manner as described with regard to reference number 720.

As shown by reference number 1125, the UE 1106 may transmit, and an application server 1102 may receive, a probe request. In some aspects, the UE 1106 may transmit the probe request in a similar manner as described with regard to reference number 730. While the example 1100 includes the UE 1106 transmitting a probe request to the application server 1102, alternate or additional examples may include a DDC orchestrator at the network node 1104 initiating the probe request. For instance, as part of the complementary and/or reciprocal functionality, the DDC orchestrator may include an ability to trigger the transmission of one or more supplemental probe messages, such as in a similar manner as the UE 706 described with regard to reference number 730. For instance, the DDC orchestrator at the network node 1104 may identify the occurrence of a trigger condition that is associated with requesting a supplemental probe request, such as a first change in a network load and/or a second change in a network congestion level satisfying a change threshold. In some aspects, and based at least in part on detecting a trigger event, the network node 1104, by way of the DDC orchestrator, may transmit an additional probe request to obtain a supplemental probe message earlier than a next scheduled periodic probe message and/or to trigger a DDC location switch.

As shown by reference number 1130, the application server 1102 may communicate, and the UE 1106 may receive, one or more probe messages. In some aspects, the application server 1102 may communicate, and/or the UE 1106 may receive, the probe message(s) in a similar manner as described with regard to reference number 735.

As shown by reference number 1135, the UE 1106 may generate one or more UE-to-XR device link quality metrics. As one example, the UE 1106 may generate the UE-to-XR device link quality metrics in a manner as described with regard to reference number 615. Alternatively, or additionally, the UE 1106 may generate one or more QoS metrics, such as an RTT measurement metric. In some aspects, the UE 1106 may access and/or obtain device capability information.

As shown by reference number 1140, the UE 1106 may transmit, and the network node 1104 may receive, a measurement report. In some aspects, the UE 1106 may transmit the measurement report in a similar manner as described with regard to reference number 1030. While the example 1100 includes the UE 1106 transmitting an indication of the measurement report, the UE 1106 may not derive and/or may not transmit an indication of a measurement report in other examples.

As shown by reference number 1145, the network node 1104 may generate one or more QoS metrics(s). In some aspects, the network node 1104 may generate the QoS metrics in a similar manner as described with regard to reference number 1035.

As shown by reference number 1150, the network node 1104 may derive a potential DDC location, which may alternatively or additionally be referred to as a network node-selected DDC location. In some aspects, the network node 1104 may derive the potential DDC location in a similar manner as described with regard to reference number 1040.

As shown by reference number 1155, the network node 1104 may transmit, and the UE 1106 may receive an indication of a potential DDC location. In some aspects, the network node 1104 may transmit the indication of the potential DDC location in a similar manner as described with regard to reference number 1045.

As shown by reference number 1160, the UE 1106 may transmit, and the application server 1102 may receive an indication of the potential DDC location (e.g., the network node-selected DDC location). In some aspects, the UE 1106 may transmit, and the application server 1102 may receive the indication of the potential DDC location in a similar manner as described with regard to reference number 1050.

As shown by reference number 1165, the application server 1102 may communicate, and any combination of the network node 1104, the UE 1106, and/or the XR device 1108 may receive, a switch indication that indicates to initiate a DDC location switch to the potential DDC location. In some aspects, the application server 1102 may communicate the switch indication as described with regard to reference number 650. Alternatively, or additionally, the UE 1106 and/or the XR device 1108 may switch in a similar manner as described with regard to reference number 650. Alternatively, or additionally, the network node 1104 may switch DDC locations.

A network node may have access to one or more QoS metrics that are unavailable to a UE and/or an application server, such as a network load, a resource utilization metric, an uplink queue size, a downlink queue size, and/or a data transfer delay estimation metric as described above. Accordingly, in some scenarios, the additional information available to the network node may enable a DDC orchestrator to select a more optimal DDC location that satisfies one or more tradeoffs relative to a UE-generated DDC location and/or an application server-derived DDC location. Alternatively, or additionally, the network node may selectively grant remote DDC processing to a portion of UEs requesting remote DDC processing based at least in part on operating information about the network congestion and/or available network resources.

As indicated above, FIG. 11 is provided as an example. Other examples may differ from what is described with regard to FIG. 11.

Figure 12:
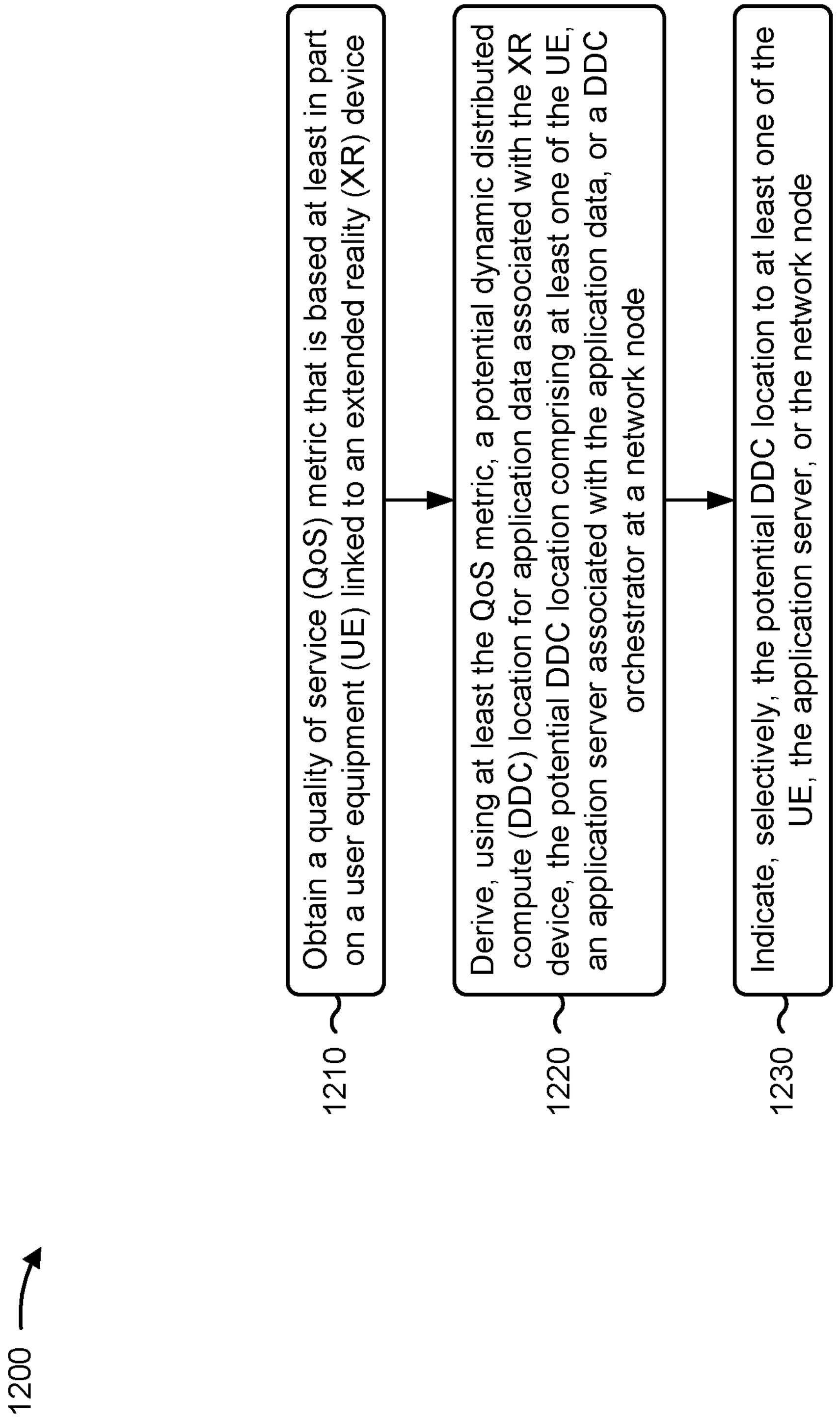
FIG. 12 is a diagram illustrating an example process performed, for example, at a computing device or an apparatus of a computing device, in accordance with the present disclosure.

FIG. 12 is a diagram illustrating an example process 1200 performed, for example, at a computing device (e.g., network node 110, UE 120, and/or application server 180) or an apparatus of a computing device (e.g., network node 110, UE 120, and/or application server 180), in accordance with the present disclosure. Example process 1200 is an example where the apparatus or the computing device (e.g., network node 110, UE 120, and/or application server 180) performs operations associated with switching a DDC location using a QoS metric.

As shown in FIG. 12, in some aspects, process 1200 may include obtaining a QoS metric that is based at least in part on a UE linked to an XR device (block 1210). For example, the computing device (e.g., using reception component 1402 and/or communication manager 1406, depicted in FIG. 14) may obtain a QoS metric that is based at least in part on a UE linked to an XR device, as described above.

As further shown in FIG. 12, in some aspects, process 1200 may include deriving, using at least the QoS metric, a potential DDC location for application data associated with the XR device, the potential DDC location including at least one of: the UE, an application server associated with the application data, or a DDC orchestrator at a network node (block 1220). For example, the computing device (e.g., using communication manager 1406, depicted in FIG. 14) may derive, using at least the QoS metric, a potential DDC location for application data associated with the XR device, the potential DDC location including at least one of: the UE, an application server associated with the application data, or a DDC orchestrator at a network node, as described above.

As further shown in FIG. 12, in some aspects, process 1200 may include indicating, selectively, the potential DDC location to at least one of: the UE, the application server, or the network node (block 1230). For example, the computing device (e.g., using communication manager 1406, depicted in FIG. 14) may indicate, selectively, the potential DDC location to at least one of: the UE, the application server, or the network node, as described above.

Process 1200 may include additional aspects, such as any single aspect or any combination of aspects described below and/or in connection with one or more other processes described elsewhere herein.

In a first aspect, the QoS metric is based at least in part on at least one of an RTT measurement metric, an ECN, or a device capability.

In a second aspect, the QoS metric is based at least in part on at least one of a network load, a resource utilization metric, an uplink queue size, a downlink queue size, or a data transfer delay estimation metric.

In a third aspect, the computing device is the UE, a current DDC location includes the application server, and obtaining the QoS metric includes at least one of computing an RTT metric using in-band data traffic or receiving an ECN.

In a fourth aspect, the computing device is the UE, a current DDC location includes the UE, and obtaining the QoS metric includes at least one of computing an RTT metric using out-of-band data traffic or receiving an ECN.

In a fifth aspect, the out-of-band data traffic includes a probe message.

In a sixth aspect, deriving the potential DDC location includes deriving the potential DDC location using the QoS metric and at least one of a first signal quality metric that is based at least in part on an access link between the UE and the network node, a second signal quality metric that is based at least in part on a communication link between the UE and the XR device, a power metric that is based at least in part on the UE, or a channel condition prediction.

In a seventh aspect, the computing device is the application server, and obtaining the QoS metric includes receiving an indication of a UE-generated measurement report that indicates the QoS metric.

In an eighth aspect, the UE-generated measurement report indicates at least one of a first RTT metric that is based at least in part on out-of-band data traffic, a second RTT metric that is based at least in part on in-band data traffic, or an ECN.

In a ninth aspect, the computing device is the application server, and obtaining the QoS metric includes receiving, from the network node, an ECN.

In a tenth aspect, the computing device is the application server, a current DDC location includes the application server, and process 1200 receiving an indication of a UE-selected DDC location.

In an eleventh aspect, the potential DDC location is based at least in part on the UE-selected DDC location.

In a twelfth aspect, the computing device includes the network node.

In a thirteenth aspect, the network node includes a DDC XR orchestrator, and the DDC XR orchestrator performs the obtaining, the deriving, and the indicating.

In a fourteenth aspect, obtaining the QoS metric includes receiving a UE-generated measurement report that indicates the QoS metric.

In a fifteenth aspect, process 1200 includes calculating, as the QoS metric, at least one of a network load, a resource utilization metric, an uplink queue size, a downlink queue size, or a data transfer delay estimation metric.

In a sixteenth aspect, process 1200 includes transmitting a request to initiate a probe procedure.

In a seventeenth aspect, the computing device is the UE, and process 1200 receiving, as at least part of the probe procedure, a probe message as out-of-band data traffic, and computing, as the QoS metric, an RTT metric using the probe message.

In an eighteenth aspect, the probe procedure includes receiving multiple probe messages in an iterative manner, the probe message being one of the multiple probe messages, and computing multiple RTT metrics using the multiple probe messages, the RTT metric being one of the multiple RTT metrics.

In a nineteenth aspect, the multiple probe messages include periodic probe messages, and process 1200 includes requesting an additional probe message that is supplemental to the periodic probe messages.

In a twentieth aspect, process 1200 includes transmitting a supplemental probe request based at least in part on a trigger condition being satisfied.

In a twenty-first aspect, process 1200 includes transmitting an early termination request that indicates to stop the probe procedure.

In a twenty-second aspect, process 1200 includes deriving that the potential DDC location is different from a current DDC location, and indicating the potential DDC location to the network node includes transmitting an indication of the potential DDC location based at least in part on the potential DDC location being different from the current DDC location.

In a twenty-third aspect, process 1200 includes switching from using the current DDC location to using the potential DDC location for computing at least some application data.

In a twenty-fourth aspect, the computing device includes the UE, and process 1200 includes receiving a switch instruction to use the potential DDC location for computing the at least some application data, and switching from using the current DDC location to using the potential DDC location is based at least in part on receiving the instruction.

In a twenty-fifth aspect, process 1200 includes deriving that the potential DDC location a same location as a current DDC location, and indicating the potential DDC location to the network node includes not transmitting an indication of the potential DDC location based at least in part on the potential DDC location being the same location as the current DDC location.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
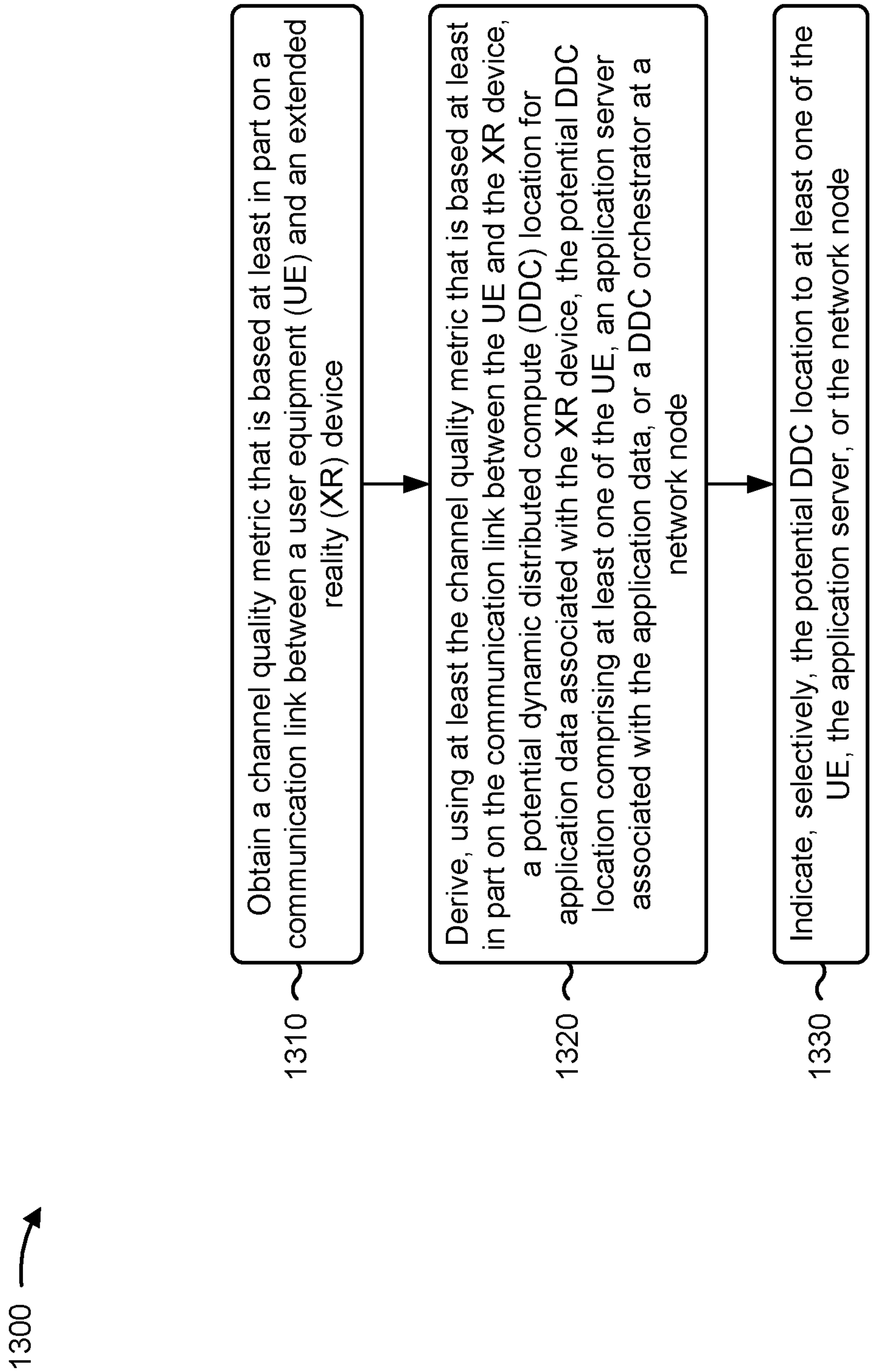
FIG. 13 is a diagram illustrating an example process performed, for example, at a computing device or an apparatus of a computing device, in accordance with the present disclosure.

FIG. 13 is a diagram illustrating an example process 1300 performed, for example, at a computing device (e.g., network node 110, UE 120, and/or application server 180) or an apparatus of a computing device (e.g., network node 110, UE 120, and/or application server 180), in accordance with the present disclosure. Example process 1300 is an example where the apparatus or the computing device (e.g., network node 110, UE 120, and/or application server 180) performs operations associated with switching a DDC location using a QoS metric.

As shown in FIG. 13, in some aspects, process 1300 may include obtaining a channel quality metric that is based at least in part on a communication link between a UE and an XR device (block 1310). For example, the computing device (e.g., using reception component 1402 and/or communication manager 1406, depicted in FIG. 14) may obtain a channel quality metric that is based at least in part on a communication link between a UE and an XR device, as described above.

As further shown in FIG. 13, in some aspects, process 1300 may include deriving, using at least the channel quality metric that is based at least in part on the communication link between the UE and the XR device, a potential DDC location for application data associated with the XR device, the potential DDC location including at least one of: the UE, an application server associated with the application data, or a DDC orchestrator at a network node (block 1320). For example, the computing device (e.g., using communication manager 1406, depicted in FIG. 14) may derive, using at least the channel quality metric that is based at least in part on the communication link between the UE and the XR device, a potential DDC location for application data associated with the XR device, the potential DDC location including at least one of: the UE, an application server associated with the application data, or a DDC orchestrator at a network node, as described above.

As further shown in FIG. 13, in some aspects, process 1300 may include indicating, selectively, the potential DDC location to at least one of: the UE, the application server, or the network node (block 1330). For example, the computing device (e.g., using communication manager 1406, depicted in FIG. 14) may indicate, selectively, the potential DDC location to at least one of: the UE, the application server, or the network node, as described above.

Process 1300 may include additional aspects, such as any single aspect or any combination of aspects described below and/or in connection with one or more other processes described elsewhere herein.

In a first aspect, the computing device includes at least one of the UE, the application server, or the network node.

In a second aspect, the computing device is the UE, and process 1300 includes computing the channel quality metric based at least in part on a communication between the UE and the XR device.

In a third aspect, process 1300 includes receiving, as the channel quality metric, an XR device-generated channel quality metric.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
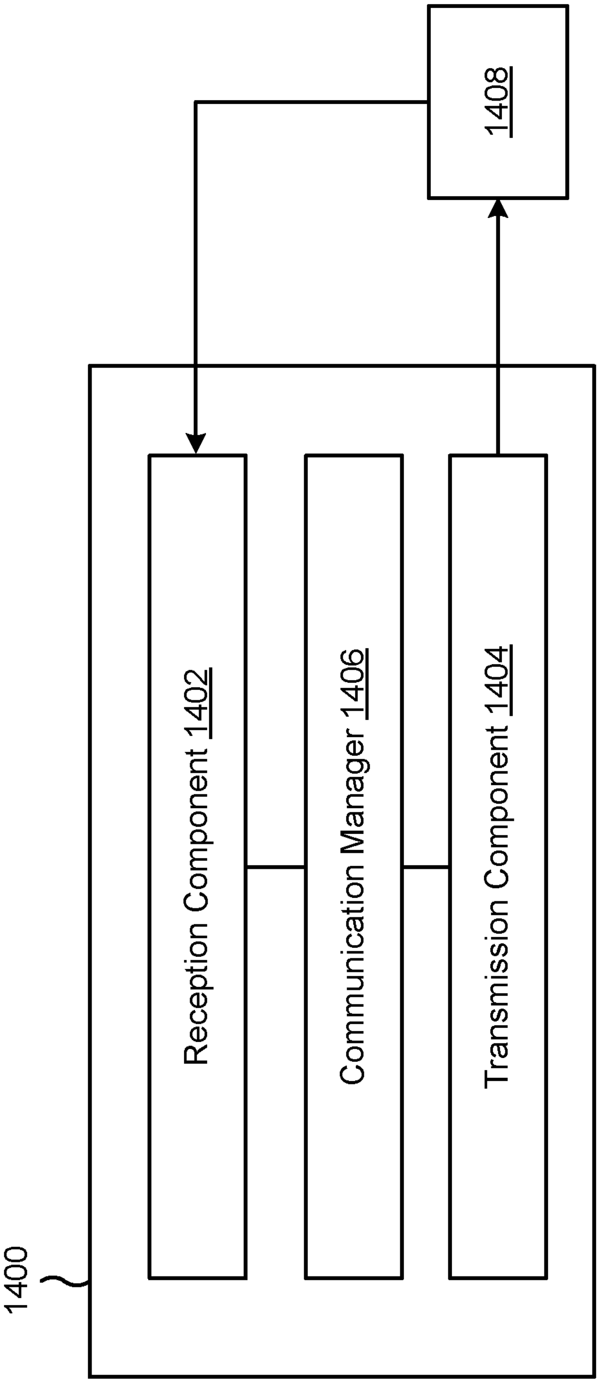
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a computing device (e.g., a network node 110, a UE 120, and/or an application server 180), or a computing device (e.g., a network node 110, a UE 120, and/or an application server 180) may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 140 described in connection with FIG. 1, such as in a scenario that the computing device is a UE 120. In some aspects, the communication manager 1406 is the communication manager 150 described in connection with FIG. 1, such as in a scenario that the computing device is a network node 110. In some aspects, the communication manager 1406 is the communication manager 190 described in connection with FIG. 1, such as in a scenario that the computing device is an application server 180. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 5-11. Additionally, or alternatively, the apparatus 1400 may be configured to perform one or more processes described herein, such as process 1200 of FIG. 12, process 1300 of FIG. 13, or a combination thereof. In some aspects, the apparatus 1400 and/or one or more components shown in FIG. 14 may include one or more components of the computing device described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, one or more modems, one or more demodulators, one or more MIMO detectors, one or more receive processors, one or more controllers/processors, one or more memories, or a combination thereof, of the computing device described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, one or more modems, one or more modulators, one or more transmit MIMO processors, one or more transmit processors, one or more controllers/processors, one or more memories, one or more communication units, or a combination thereof, of the computing device described in connection with FIG. 2. In some aspects, the transmission component 1404 may be co-located with the reception component 1402 in one or more transceivers.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

The reception component 1402 may obtain a QoS metric that is based at least in part on a UE linked to an XR device. The communication manager 1406 may derive, using at least the QoS metric, a potential DDC location for application data associated with the XR device, the potential DDC location including at least one of the UE, an application server associated with the application data, or a DDC orchestrator at a network node. The communication manager 1406 may indicate, selectively, the potential DDC location to at least one of the UE, the application server, or the network node.

The communication manager 1406 may calculate, as the QoS metric, at least one of a network load, a resource utilization metric, an uplink queue size, a downlink queue size, or a data transfer delay estimation metric. In some aspects, the transmission component 1404 may transmit a request to initiate a probe procedure. Alternatively, or additionally, the transmission component 1404 may transmit a supplemental probe request based at least in part on a trigger condition being satisfied. In some aspects, the transmission component 1404 may transmit an early termination request that indicates to stop the probe procedure.

The communication manager 1406 may derive that the potential DDC location is different from a current DDC location. Alternatively, or additionally, the communication manager 1406 may switch from using the current DDC location to using the potential DDC location for computing at least some application data. In some aspects, the communication manager 1406 may derive that the potential DDC location a same location as a current DDC location.

In some aspects, the reception component 1402 may obtain a channel quality metric that is based at least in part on a communication link between a UE and an XR device. The communication manager 1406 may derive, using at least the channel quality metric that is based at least in part on the communication link between the UE and the XR device, a potential DDC location for application data associated with the XR device, the potential DDC location including at least one of the UE, an application server associated with the application data, or a DDC orchestrator at a network node.

The communication manager 1406 may indicate, selectively, the potential DDC location to at least one of the UE, the application server, or the network node. In some aspects, the reception component 1402 may receive, as a channel quality metric, an XR device-generated channel quality metric.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method performed by a computing device, comprising: obtaining a quality of service (QoS) metric that is based at least in part on a user equipment (UE) linked to an extended reality (XR) device; deriving, using at least the QoS metric, a potential dynamic distributed compute (DDC) location for application data associated with the XR device, the potential DDC location comprising at least one of: the UE, an application server associated with the application data, or a DDC orchestrator at a network node; and indicating, selectively, the potential DDC location to at least one of: the UE, the application server, or the network node.

Aspect 2: The method of Aspect 1, wherein the QoS metric is based at least in part on at least one of: a round trip time (RTT) measurement metric, an explicit congestion notification (ECN), or a device capability.

Aspect 3: The method of Aspect 2, wherein the QoS metric is based at least in part on at least one of: a network load, a resource utilization metric, an uplink queue size, a downlink queue size, or a data transfer delay estimation metric.

Aspect 4: The method of any of Aspects 1-3, wherein the computing device is the UE, wherein a current DDC location comprises the application server, and wherein obtaining the QoS metric comprises at least one of: computing a round trip time (RTT) metric using in-band data traffic or receiving an explicit congestion notification (ECN).

Aspect 5: The method of any of Aspects 1-4, wherein the computing device is the UE, wherein a current DDC location comprises the UE, and wherein obtaining the QoS metric comprises at least one of: computing a round trip time (RTT) metric using out-of-band data traffic or receiving an explicit congestion notification (ECN).

Aspect 6: The method of Aspect 5, wherein the out-of-band data traffic comprises a probe message.

Aspect 7: The method of any of Aspects 1-6, wherein deriving the potential DDC location comprises: deriving the potential DDC location using the QoS metric and at least one of: a first signal quality metric that is based at least in part on an access link between the UE and the network node, a second signal quality metric that is based at least in part on a communication link between the UE and the XR device, a power metric that is based at least in part on the UE, or a channel condition prediction.

Aspect 8: The method of any of Aspects 1-7, wherein the computing device is the application server, and wherein obtaining the QoS metric comprises: receiving an indication of a UE-generated measurement report that indicates the QoS metric.

Aspect 9: The method of Aspect 8, wherein the UE-generated measurement report indicates at least one of: a first round trip time (RTT) metric that is based at least in part on out-of-band data traffic, a second RTT metric that is based at least in part on in-band data traffic, or an explicit congestion notification (ECN).

Aspect 10: The method of any of Aspects 1-9, wherein the computing device is the application server, and wherein obtaining the QoS metric comprises: receiving, from the network node, an explicit congestion notification (ECN).

Aspect 11: The method of any of Aspects 1-10, wherein the computing device is the application server, wherein a current DDC location comprises the application server, and wherein the method further comprises: receiving an indication of a UE-selected DDC location.

Aspect 12: The method of Aspect 11, wherein the potential DDC location is based at least in part on the UE-selected DDC location.

Aspect 13: The method of any of Aspects 1-12, wherein the computing device comprises the network node.

Aspect 14: The method of Aspect 13, wherein the network node includes a DDC XR orchestrator, and wherein the DDC XR orchestrator performs the obtaining, the deriving, and the indicating.

Aspect 15: The method of Aspect 14, wherein obtaining the QoS metric comprises: receiving a UE-generated measurement report that indicates the QoS metric.

Aspect 16: The method of Aspect 13, further comprising: calculating, as the QoS metric, at least one of: a network load, a resource utilization metric, an uplink queue size, a downlink queue size, or a data transfer delay estimation metric.

Aspect 17: The method of any of Aspects 1-16, further comprising: transmitting a request to initiate a probe procedure.

Aspect 18: The method of Aspect 17, wherein the computing device is the UE, and wherein the method further comprises: receiving, as at least part of the probe procedure, a probe message as out-of-band data traffic; and computing, as the QoS metric, a round trip time (RTT) metric using the probe message.

Aspect 19: The method of Aspect 18, wherein the probe procedure comprises: receiving multiple probe messages in an iterative manner, the probe message being one of the multiple probe messages; and computing multiple RTT metrics using the multiple probe messages, the RTT metric being one of the multiple RTT metrics.

Aspect 20: The method of Aspect 19, wherein the multiple probe messages comprise periodic probe messages, and wherein the method further comprises: requesting an additional probe message that is supplemental to the periodic probe messages.

Aspect 21: The method of Aspect 17, further comprising: transmitting a supplemental probe request based at least in part on a trigger condition being satisfied.

Aspect 22: The method of Aspect 17, further comprising: transmitting an early termination request that indicates to stop the probe procedure.

Aspect 23: The method of any of Aspects 1-22, further comprising: deriving that the potential DDC location is different from a current DDC location, wherein indicating the potential DDC location to the network node comprises: transmitting an indication of the potential DDC location based at least in part on the potential DDC location being different from the current DDC location, wherein indicating the potential DDC location to the network node comprises: transmitting an indication of the potential DDC location based at least in part on the potential DDC location being different from the current DDC location.

Aspect 24: The method of Aspect 23, further comprising: switching from using the current DDC location to using the potential DDC location for computing at least some application data.

Aspect 25: The method of Aspect 24, wherein the computing device comprises the UE, and wherein the method further comprises: receiving a switch instruction to use the potential DDC location for computing the at least some application data, wherein switching from using the current DDC location to using the potential DDC location is based at least in part on receiving the instruction.

Aspect 26: The method of any of Aspects 1-25, further comprising: deriving that the potential DDC location a same location as a current DDC location, wherein indicating the potential DDC location to the network node comprises: not transmitting an indication of the potential DDC location based at least in part on the potential DDC location being the same location as the current DDC location, wherein indicating the potential DDC location to the network node comprises: not transmitting an indication of the potential DDC location based at least in part on the potential DDC location being the same location as the current DDC location.

Aspect 27: A method performed by a computing device, comprising: obtaining a channel quality metric that is based at least in part on a communication link between a user equipment (UE) and an extended reality (XR) device; deriving, using at least the channel quality metric that is based at least in part on the communication link between the UE and the XR device, a potential dynamic distributed compute (DDC) location for application data associated with the XR device, the potential DDC location comprising at least one of: the UE, an application server associated with the application data, or a DDC orchestrator at a network node; and indicating, selectively, the potential DDC location to at least one of: the UE, the application server, or the network node.

Aspect 28: The method of Aspect 27, wherein the computing device comprises at least one of: the UE, the application server, or the network node.

Aspect 29: The method of any of Aspects 27-28, wherein the computing device is the UE, and the method further comprises: computing the channel quality metric based at least in part on a communication between the UE and the XR device.

Aspect 30: The method of any of Aspects 27-29, further comprising: receiving, as the channel quality metric, an XR device-generated channel quality metric.

Aspect 31: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-30.

Aspect 32: An apparatus for wireless communication at a device, the apparatus comprising one or more memories and one or more processors coupled to the one or more memories, the one or more processors configured to cause the device to perform the method of one or more of Aspects 1-30.

Aspect 33: An apparatus for wireless communication, the apparatus comprising at least one means for performing the method of one or more of Aspects 1-30.

Aspect 34: A non-transitory computer-readable medium storing code for wireless communication, the code comprising instructions executable by one or more processors to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

Aspect 36: A device for wireless communication, the device comprising a processing system that includes one or more processors and one or more memories coupled with the one or more processors, the processing system configured to cause the device to perform the method of one or more of Aspects 1-30.

Aspect 37: An apparatus for wireless communication at a device, the apparatus comprising one or more memories and one or more processors coupled to the one or more memories, the one or more processors individually or collectively configured to cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a computing device, comprising:

one or more memories; and one or more processors, coupled to the one or more memories, configured to cause the computing device to:

obtain a quality of service (QoS) metric that is based at least in part on a user equipment (UE) linked to an extended reality (XR) device;

compute a round trip time (RTT) metric using out-of-band data traffic, or receive an explicit congestion notification (ECN);

derive, using at least the QoS metric, a potential dynamic distributed compute (DDC) location for application data associated with the XR device, the potential DDC location comprising at least one of:

the UE, an application server associated with the application data, or a DDC orchestrator at a network node; and indicate, selectively, the potential DDC location to at least one of:

the UE, the application server, or the network node, wherein the computing device is the UE and wherein a current DDC location comprises the application server.

2. The apparatus of claim 1, wherein the QoS metric is based at least in part on at least one of:

the round trip time (RTT) measurement metric, the explicit congestion notification (ECN), or a device capability.

3. The apparatus of claim 1, wherein the computing device is the UE, wherein a current DDC location comprises the UE, and wherein the one or more processors, to cause the computing device to obtain the QoS metric, are configured to cause the computing device to:

compute the round trip time (RTT) metric using out-of-band data traffic, or receive the explicit congestion notification (ECN).

4. The apparatus of claim 1, wherein the one or more processors, to cause the computing device to derive the potential DDC location, are configured to cause the computing device to:

derive the potential DDC location using the QoS metric and at least one of:

a first signal quality metric that is based at least in part on an access link between the UE and the network node, a second signal quality metric that is based at least in part on a communication link between the UE and the XR device, a power metric that is based at least in part on the UE, or a channel condition prediction.

5. The apparatus of claim 1, wherein the computing device is the application server, and wherein the one or more processors, to cause the computing device to obtain the QoS metric, are configured to cause the computing device to:

receive an indication of a UE-generated measurement report that indicates the QoS metric.

6. The apparatus of claim 1, wherein the computing device is the application server, and wherein the one or more processors, to cause the computing device to obtain the QoS metric, are configured to cause the computing device to:

receive, from the network node, the explicit congestion notification (ECN).

7. The apparatus of claim 1, wherein the computing device is the application server, wherein a current DDC location comprises the application server, and wherein the one or more processors are further configured to cause the computing device to:

receive an indication of a UE-selected DDC location.

8. The apparatus of claim 1, wherein the computing device comprises the network node, wherein the network node includes a DDC XR orchestrator, and wherein the DDC XR orchestrator performs the obtaining, the deriving, and the indicating.

9. The apparatus of claim 1, wherein the one or more processors are further configured to cause the computing device to:

transmit a request to initiate a probe procedure.

10. The apparatus of claim 9, wherein the computing device is the UE, and wherein the one or more processors are further configured to cause the computing device to:

receive, as at least part of the probe procedure, a probe message as out-of-band data traffic; and compute, as the QoS metric, a round trip time (RTT) metric using the probe message.

11. The apparatus of claim 1, wherein the one or more processors are further configured to cause the computing device to:

derive that the potential DDC location is different from a current DDC location, wherein the one or more processors, to cause the computing device to indicate the potential DDC location to the network node, are configured to cause the computing device to:

transmit an indication of the potential DDC location based at least in part on the potential DDC location being different from the current DDC location.

12. An apparatus for wireless communication at a computing device, comprising:

one or more memories; and one or more processors, coupled to the one or more memories, configured to cause the computing device to:

obtain a channel quality metric that is based at least in part on a communication link between a user equipment (UE) and an extended reality (XR) device;

compute a round trip time (RTT) metric using out-of-band data traffic, or receive an explicit congestion notification (ECN);

derive, using at least the channel quality metric that is based at least in part on the communication link between the UE and the XR device, a potential dynamic distributed compute (DDC) location for application data associated with the XR device, the potential DDC location comprising at least one of:

the UE, an application server associated with the application data, or a DDC orchestrator at a network node; and indicate, selectively, the potential DDC location to at least one of:

the UE, the application server, or the network node, wherein the computing device is the UE and wherein a current DDC location comprises the application server.

13. The apparatus of claim 12, wherein the one or more processors are further configured to cause the computing device to:

compute the channel quality metric based at least in part on a communication between the UE and the XR device.

14. The apparatus of claim 12, wherein the one or more processors are further configured to cause the computing device to:

receive, as the channel quality metric, an XR device-generated channel quality metric.

15. A method performed by a computing device, comprising:

obtaining a quality of service (QoS) metric that is based at least in part on a user equipment (UE) linked to an extended reality (XR) device, wherein obtaining the QoS metric comprises at least one of:

computing a round trip time (RTT) metric using in-band data traffic, or receiving an explicit congestion notification (ECN);

deriving, using at least the QoS metric, a potential dynamic distributed compute (DDC) location for application data associated with the XR device, the potential DDC location comprising at least one of:

the UE, an application server associated with the application data, or a DDC orchestrator at a network node; and indicating, selectively, the potential DDC location to at least one of:

the UE, the application server, or the network node, wherein the computing device is the UE and a current DDC location comprises the application server.

16. The method of claim 15, wherein deriving the potential DDC location comprises:

deriving the potential DDC location using the QoS metric and at least one of:

a first signal quality metric that is based at least in part on an access link between the UE and the network node, a second signal quality metric that is based at least in part on a communication link between the UE and the XR device, a power metric that is based at least in part on the UE, or a channel condition prediction.

17. The method of claim 15, wherein the computing device is the application server, and wherein obtaining the QoS metric comprises:

receiving at least one of:

an indication of a UE-generated measurement report that indicates the QoS metric, or the explicit congestion notification (ECN).

18. The method of claim 15, wherein the computing device comprises the network node, wherein the network node includes a DDC XR orchestrator, and wherein the DDC XR orchestrator performs the obtaining, the deriving, and the indicating.

* * * * *